United States Patent
Trudeau et al.

(10) Patent No.: US 11,092,371 B2
(45) Date of Patent: *Aug. 17, 2021

(54) SYSTEM AND METHOD OF CONTROLLING A VARIABLE-CAPACITY COMPRESSOR AND A VARIABLE-CAPACITY FAN USING A TWO-STAGE THERMOSTAT

(71) Applicant: Emerson Climate Technologies, Inc., Sidney, OH (US)

(72) Inventors: Edward J. Trudeau, Covington, OH (US); Michael D. Oakley, Oakwood, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,558

(22) Filed: Sep. 9, 2019

(65) Prior Publication Data

US 2019/0390886 A1 Dec. 26, 2019

Related U.S. Application Data

(63) Continuation of application No. 15/457,418, filed on Mar. 13, 2017, now Pat. No. 10,408,517.

(Continued)

(51) Int. Cl.
*F25B 49/02* (2006.01)
*F25B 13/00* (2006.01)
(Continued)

(52) U.S. Cl.
CPC ............ *F25B 49/022* (2013.01); *F24F 11/61* (2018.01); *F24F 11/81* (2018.01); *F24F 11/86* (2018.01);
(Continued)

(58) Field of Classification Search
CPC .................. F25B 49/022; F25B 13/00; F25B 2600/0253; F25B 2313/0293; F25B 2313/0294; F25B 2700/2104; F25B 49/02
(Continued)

(56) References Cited

U.S. PATENT DOCUMENTS 4,228,846 A 10/1980 Smorol
4,257,238 A 3/1981 Kountz et al.
(Continued)

FOREIGN PATENT DOCUMENTS

AU 744608 B2 2/2002
CN 1239211 A 12/1999
(Continued)

OTHER PUBLICATIONS

Notice of Allowance regarding U.S. Appl. No. 15/602,328 dated Jan. 24, 2020.
(Continued)

*Primary Examiner* — Henry T Crenshaw
(74) *Attorney, Agent, or Firm* — Harness, Dickey & Pierce, P.L.C.

(57) ABSTRACT

A system includes a compressor, an indoor fan, a thermostat, an indoor fan controller, and a compressor controller. The thermostat provides first and second signals based on indoor loading. The fan controller operates the fan in low speed mode and the compressor controller operates the compressor in low capacity mode when only the first signal is asserted. The compressor controller automatically switches the compressor to high capacity mode if only the first signal remains asserted past the low capacity mode runtime. The fan controller operates the fan in high speed mode when the second signal is asserted while the first signal is still asserted. The compressor controller continues to operate the compressor in high capacity mode and the fan controller (Continued)

operates the fan in low speed mode after the second signal is de-asserted, until the first signal is de-asserted, at which point the fan and compressor are turned off.

19 Claims, 13 Drawing Sheets

Related U.S. Application Data

(60) Provisional application No. 62/309,048, filed on Mar. 16, 2016.

(51) Int. Cl.
  *F24F 11/61* (2018.01)
  *F24F 11/81* (2018.01)
  *F24F 11/86* (2018.01)
  *F24F 140/50* (2018.01)
  *F24F 110/12* (2018.01)
  *F24F 110/10* (2018.01)

(52) U.S. Cl.
  CPC ........... *F25B 49/02* (2013.01); *F24F 2110/10* (2018.01); *F24F 2110/12* (2018.01); *F24F 2140/50* (2018.01); *F25B 13/00* (2013.01); *F25B 2313/0293* (2013.01); *F25B 2313/0294* (2013.01); *F25B 2600/01* (2013.01); *F25B 2600/0253* (2013.01); *F25B 2700/2104* (2013.01); *F25B 2700/2106* (2013.01); *Y02B 30/70* (2013.01)

(58) Field of Classification Search
  USPC ........................................................ 62/228.1
  See application file for complete search history.

(56) References Cited

U.S. PATENT DOCUMENTS

| | | |
|---|---|---|
| 4,431,134 A | 2/1984 | Hendricks et al. |
| 4,574,871 A | 3/1986 | Parkinson et al. |
| 4,685,615 A | 8/1987 | Hart |
| 5,062,276 A | 11/1991 | Dudley |
| 5,129,234 A | 7/1992 | Alford |
| 5,305,822 A | 4/1994 | Kogetsu et al. |
| 5,381,669 A | 1/1995 | Bahel et al. |
| 5,385,453 A | 1/1995 | Fogt et al. |
| 6,213,731 B1 | 4/2001 | Doepker et al. |
| 6,293,116 B1 | 9/2001 | Forrest et al. |
| 6,318,101 B1 | 11/2001 | Pham et al. |
| 6,450,409 B1 | 9/2002 | Rowlette et al. |
| 6,578,373 B1 | 6/2003 | Barbier |
| 6,679,072 B2 | 1/2004 | Pham et al. |
| 7,752,854 B2 | 7/2010 | Singh et al. |
| 7,845,179 B2 | 12/2010 | Singh et al. |
| 8,011,199 B1 | 9/2011 | Chen et al. |
| 8,209,073 B2 | 6/2012 | Wijaya et al. |
| 8,418,483 B2 | 4/2013 | McSweeney et al. |
| 8,459,053 B2 | 6/2013 | Pham et al. |
| 8,485,789 B2 | 7/2013 | Gu et al. |
| 8,538,587 B2 | 9/2013 | Hess et al. |
| 8,585,382 B2 | 11/2013 | Akei et al. |
| 8,616,014 B2 | 12/2013 | Stover et al. |
| 8,863,536 B1 | 10/2014 | Perry et al. |
| 9,194,393 B2 | 11/2015 | Pham |
| 9,562,710 B2 | 2/2017 | Pham et al. |
| 9,709,311 B2 | 7/2017 | Popli et al. |
| 10,018,392 B2 | 7/2018 | Guo |
| 10,197,319 B2 | 2/2019 | Popli et al. |
| 10,371,426 B2 | 8/2019 | Pham et al. |
| 10,436,490 B2 | 10/2019 | Pham et al. |
| 10,436,491 B2 * | 10/2019 | Popli .................... F25B 49/022 |
| 10,488,092 B2 | 11/2019 | Trudeau, Jr. et al. |
| 2003/0033823 A1 | 2/2003 | Pham et al. |
| 2003/0156946 A1 | 8/2003 | Tolbert |
| 2005/0155369 A1 | 7/2005 | Ootori et al. |
| 2005/0257538 A1 | 11/2005 | Hwang et al. |
| 2006/0032253 A1 | 2/2006 | Lee et al. |
| 2006/0037332 A1 | 2/2006 | Hwang et al. |
| 2006/0156749 A1 | 7/2006 | Lee et al. |
| 2006/0260334 A1 | 11/2006 | Carey et al. |
| 2006/0280627 A1 | 12/2006 | Jayanth |
| 2007/0012052 A1 | 1/2007 | Butler et al. |
| 2007/0032909 A1 | 2/2007 | Tolbert et al. |
| 2007/0063059 A1* | 3/2007 | Votaw .................... F24F 3/001 236/1 B |
| 2007/0079620 A1 | 4/2007 | Lee |
| 2007/0151267 A1 | 7/2007 | Hatano et al. |
| 2007/0267508 A1 | 11/2007 | Hoglund et al. |
| 2008/0135635 A1 | 6/2008 | Deng et al. |
| 2008/0286118 A1 | 11/2008 | Gu et al. |
| 2009/0159716 A1 | 6/2009 | Kim |
| 2010/0064714 A1* | 3/2010 | Tashiro ............. H05K 7/20745 62/259.2 |
| 2010/0082162 A1 | 4/2010 | Mundy et al. |
| 2010/0107668 A1 | 5/2010 | Voorhis et al. |
| 2010/0179703 A1 | 7/2010 | Singh et al. |
| 2010/0218527 A1 | 9/2010 | Kitagishi et al. |
| 2010/0268397 A1 | 10/2010 | Whitehurst et al. |
| 2010/0275628 A1 | 11/2010 | Moseley |
| 2010/0314458 A1 | 12/2010 | Votaw et al. |
| 2011/0014890 A1 | 1/2011 | Ajram et al. |
| 2012/0090337 A1* | 4/2012 | Chen ...................... F25B 30/02 62/79 |
| 2012/0185728 A1 | 7/2012 | Guo et al. |
| 2012/0297805 A1* | 11/2012 | Kamada ................... F25B 5/02 62/208 |
| 2012/0318007 A1 | 12/2012 | Lukasse et al. |
| 2013/0125572 A1 | 5/2013 | Childs et al. |
| 2013/0167571 A1 | 7/2013 | Nakagawa |
| 2014/0033746 A1 | 2/2014 | McSweeney |
| 2014/0262134 A1 | 9/2014 | Arensmeier et al. |
| 2015/0219356 A1 | 8/2015 | Ito et al. |
| 2015/0323212 A1 | 11/2015 | Warren et al. |
| 2016/0313039 A1 | 10/2016 | Popli et al. |
| 2016/0313040 A1 | 10/2016 | Trudeau et al. |
| 2016/0313042 A1 | 10/2016 | Popli et al. |
| 2017/0268812 A1 | 9/2017 | Trudeau et al. |
| 2017/0343230 A1 | 11/2017 | Popli et al. |
| 2017/0350633 A1 | 12/2017 | Popli et al. |
| 2019/0170417 A1 | 6/2019 | Popli et al. |
| 2020/0033038 A1* | 1/2020 | Popli ...................... F24F 11/30 |

FOREIGN PATENT DOCUMENTS

| | | |
|---|---|---|
| CN | 1291702 A | 4/2001 |
| CN | 1467441 A | 1/2004 |
| CN | 1482408 A | 3/2004 |
| CN | 1517624 A | 8/2004 |
| CN | 1632399 A | 6/2005 |
| CN | 1699865 A | 11/2005 |
| CN | 1699869 A | 11/2005 |
| CN | 1737440 A | 2/2006 |
| CN | 1796879 A | 7/2006 |
| CN | 1873352 A | 12/2006 |
| CN | 1991173 A | 7/2007 |
| CN | 101103201 A | 1/2008 |
| CN | 101109553 A | 1/2008 |
| CN | 101137873 A | 3/2008 |
| CN | 101464022 A | 6/2009 |
| CN | 101586866 A | 11/2009 |
| CN | 101968249 A | 2/2011 |
| CN | 103216910 A | 7/2013 |
| CN | 103851743 A | 6/2014 |
| CN | 104596171 A | 5/2015 |
| EP | 1398576 A2 | 3/2004 |
| EP | 1605214 A2 | 12/2005 |
| EP | 1684025 A1 | 7/2006 |
| EP | 2050958 A1 | 4/2009 |
| EP | 2443403 A1 | 4/2012 |
| EP | 2772699 A1 | 9/2014 |
| JP | H03160261 A | 7/1991 |

(56) References Cited

FOREIGN PATENT DOCUMENTS

| | | |
|---|---|---|
| JP | H09318140 A | 12/1997 |
| JP | 2745836 B2 | 4/1998 |
| KR | 100715999 B1 | 5/2007 |
| KR | 20070071090 A | 7/2007 |
| KR | 20080089967 A | 10/2008 |
| KR | 20100059522 A | 6/2010 |
| KR | 20130033847 A | 4/2013 |
| WO | WO-9814739 A1 | 4/1998 |
| WO | WO-2007130051 A1 | 11/2007 |
| WO | WO-2009061301 A1 | 5/2009 |
| WO | WO-2013149210 A1 | 10/2013 |
| WO | WO-2014017316 A1 | 1/2014 |
| WO | WO-2015153766 A1 | 10/2015 |

OTHER PUBLICATIONS

Extended European Search Report regarding European Patent Application No. 17803598.6, dated Dec. 16, 2019.
Office Action regarding Chinese Patent Application No. 201780017242.3, dated Jan. 3, 2020. Translation provided by Unitalen Attorneys at Law.
U.S. Appl. No. 16/266,932, filed Feb. 4, 2019, Sahil Popli.
U.S. Appl. No. 16/593,121, filed Oct. 4, 2019, Sahil Popli.
Notice of Allowance regarding U.S. Appl. No. 15/138,771 dated Sep. 18, 2019.
Search Report regarding European Patent Application No. 17767461.1, dated Oct. 22, 2019.
U.S. Appl. No. 15/602,328, filed May 23, 2017, Sahil Popli.
Applicant-Initiated Interview Summary regarding U.S. Appl. No. 15/457,418, dated Oct. 2, 2018.
Corrected Notice of Allowability regarding U.S. Appl. No. 15/457,418 dated May 10, 2019.
European Search Report regarding European Application No. 16787055.9, dated Mar. 27, 2019.
Final Office Action regarding U.S. Appl. No. 15/138,771 dated Apr. 18, 2019.
First Examination Report for Indian Application No. 201621018358 dated Mar. 27, 2019, 6 pages.
International Search Report regarding International Application No. PCT/US2016/029536, dated Sep. 12, 2016.
International Search Report regarding International Application No. PCT/US2016/029543, dated Aug. 9, 2016.
International Search Report regarding International Application No. PCT/US2016/029588, dated Aug. 9, 2016.
International Search Report regarding International Application No. PCT/US2016/029593, dated Aug. 10, 2016.
International Search Report regarding International Application No. PCT/US2017/022563, dated Jun. 26, 2017.
International Search Report regarding International Application No. PCT/US2017/034510, dated Aug. 28, 2017.
Non-Final Office Action regarding U.S. Appl. No. 15/602,328 dated Sep. 5, 2019.
Non-Final Office Action regarding U.S. Appl. No. 15/138,771 dated Jun. 5, 2018.
Notice of Allowability and Applicant-Initiated Interview Summary regarding U.S. Appl. No. 15/457,418 dated Jun. 3, 2019.
Notice of Allowance and Fees Due dated May 25, 2017.
Notice of Allowance regarding U.S. Appl. No. 15/138,771 dated Aug. 16, 2019.
Notice of Allowance regarding U.S. Appl. No. 15/457,418 dated May 1, 2019.
Notice of Allowance regarding U.S. Appl. No. 15/457,418, dated Feb. 7, 2019.
Notice of Allowance regarding U.S. Appl. No. 16/193,310 dated Aug. 14, 2019.
Notice of Allowance regarding U.S. Appl. No. 16/193,310 dated Jul. 8, 2019.
Notice of Allowance regarding U.S. Appl. No. 15/138,981, dated Jul. 2, 2018.
Notice of Allowance regarding U.S. Appl. No. 15/651,942 dated Aug. 16, 2018.
Notice of Allowance regarding U.S. Appl. No. 15/651,942 dated Jul. 9, 2018.
Office Action regarding Chinese Patent Application No. 201680030841.4, dated Jun. 24, 2019. Translation provided by Unitalen Attorneys at Law.
Office Action regarding Chinese Patent Application No. 201680030864.5, dated Aug. 5, 2019. Translation provided by Unitalen Attorneys at Law.
Office Action regarding Chinese Patent Application No. 201680031951.2, dated Jul. 3, 2019. Translation provided by Unitalen Attorneys at Law.
Office Action regarding Chinese Patent Application No. 201680032857.9, dated Jul. 3, 2019. Translation provided by Unitalen Attorneys at Law.
Office Action regarding U.S. Appl. No. 15/457,418, dated Jul. 26, 2018.
Written Opinion of the International Searching Authority regarding International Application No. PCT/US2016/029536, dated Sep. 12, 2016.
Written Opinion of the International Searching Authority regarding International Application No. PCT/US2016/029543, dated Aug. 9, 2016.
Written Opinion of the International Searching Authority regarding International Application No. PCT/US2016/029588, dated Aug. 9, 2016.
Written Opinion of the International Searching Authority regarding International Application No. PCT/US2017/022563, dated Jun. 26, 2017.
Written Opinion of the International Searching Authority regarding International Application No. PCT/US2017/034510, dated Aug. 28, 2017.
Written Opinion of the International Searcing Authority regarding International Application No. PCT/US2016/029593, dated Aug. 10, 2016.
Applicant-Initiated Interview Summary regarding U.S. Appl. No. 16/266,932 dated Sep. 14, 2020.
Non-Final Office Action regarding U.S. Appl. No. 16/266,932 dated Jun. 24, 2020.
Notice of Allowance regarding U.S. Appl. No. 15/602,328 dated Apr. 22, 2020.
Notice of Allowance regarding U.S. Appl. No. 16/266,932 dated Sep. 24, 2020.
Office Action regarding Chinese Patent Application No. 201680030841.4, dated Mar. 16, 2020. Translation provided by Unitalen Attorneys at Law.
Office Action regarding Chinese Patent Application No. 201780017242.3, dated Jun. 15, 2020 Translation provided by Unitalen Attorneys at Law.
Office Action regarding Chinese Patent Application No. 201780032216.8, dated Jul. 9, 2020 Translation provided by Unitalen Attorneys at Law.
Non-Final Office Action regarding U.S. Appl. No. 16/593,121 dated Feb. 2, 2021.

* cited by examiner

FIG. 3

345

| OAT (°F) | BASELINE T1 | OVERRIDE T1 |
|---|---|---|
| >90 | 5 seconds | If $T2_{n-1}$ >5min, then $T1_n$ =5sec, else $T1_n$ =40min |
| 85-90 | 30 minutes | If $T2_{n-1}$ >5min, then $T1_n$ =5sec, else $T1_n$ =40min |
| 80-85 | 35 minutes | Not applicable. See Baseline T1 Column. |
| 75-80 | 40 minutes | Not applicable. See Baseline T1 Column. |
| 70-75 | 50 minutes | Not applicable. See Baseline T1 Column. |
| 65-70 | 60 minutes | Not applicable. See Baseline T1 Column. |
| 60-65 | 60 minutes | Not applicable. See Baseline T1 Column. |
| 55-60 | 50 minutes | Not applicable. See Baseline T1 Column. |
| 50-55 | 40 minutes | Not applicable. See Baseline T1 Column. |
| 45-50 | 40 minutes | Not applicable. See Baseline T1 Column. |
| 40-45 | 30 minutes | If $T2_{n-1}$ >5min, then $T1_n$ =5sec, else $T1_n$ =20min |
| <40 | 5 seconds | If $T2_{n-1}$ >5min, then $T1_n$ =5sec, else $T1_n$ =20min |

347

| Region | Sensible Load (Temperature) | Latent Load (Humidity) | Indoor Blower Speed |
|---|---|---|---|
| Hot and Humid | Medium/low | High | Low |
| Very Hot/Dry | High | Low | High |
| Mixed - Mild | Medium/low | Low | Low/Medium |
| Mixed - Humid | Medium/low | Medium | Low |

FIG. 6

| Region - Hot and Humid | 12 AM to 6 AM | 6 AM to 12 PM | 12 PM to 6PM | 6 PM to 12AM |
|---|---|---|---|---|
| Y1/Y2 setting | Y1 | More Y1+Y2 | Y1 + more Y2 | Y1 + reducing Y2 |
| Ambient temperature Slope | Neutral | Positive | Reducing | Reducing/ Neutral |
| Sensible Load | Low | Low | Medium | Medium/Low |
| Latent Load | Medium | High | Very High | High |

FIG. 7

| Region- Very Hot/Dry | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Medium | Med/High | High | Med/Low |
| Latent Load | | | Low | |

FIG. 8

| Region-Mixed-Mild | 12 AM to 6 AM | 6 AM to 12 PM | 12 PM to 6 PM | 6 PM to 12AM |
|---|---|---|---|---|
| Y1/Y2 setting | Y1 | Y1 | Y1 + more Y2 | More Y1 + reducing Y2 |
| Ambient temperature Slope | Neutral | Positive | Reducing | Reducing/ Neutral |
| Sensible Load | Low | Low | Medium/High | Medium/Low |
| Latent Load | | | Low | |

FIG. 9

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 |
| Ambient temperature Slope | Neutral | Positive | Reducing | Reducing/Neutral |
| Sensible Load | Low | Low | Medium/High | Medium/Low |
| Latent Load | Low | Low | Medium | Medium/Low |

FIG. 10

SYSTEM AND METHOD OF CONTROLLING A VARIABLE-CAPACITY COMPRESSOR AND A VARIABLE-CAPACITY FAN USING A TWO-STAGE THERMOSTAT

CROSS-REFERENCE TO RELATED APPLICATIONS

This application is a continuation of U.S. Non-Provisional application Ser. No. 15/457,418, filed on Mar. 13, 2017 which claims the benefit of U.S. Provisional Application No. 62/309,048, filed on Mar. 16, 2016. The entire disclosures of the above applications are incorporated herein by reference in its entirety.

FIELD

The present disclosure relates to two-stage a climate-control systems having a variable-capacity compressor and a two-stage thermostat and to methods for controlling the climate-control system.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Varying a capacity of the compressor can impact the energy-efficiency of the system and the speed with which the system is able to heat or cool a room or space.

SUMMARY

This section provides a general summary of the disclosure, and is not a comprehensive disclosure of its full scope or all of its features.

In one form, a climate control system comprises a two stage thermostat, a compressor, an indoor fan, and a controller. The two stage thermostat provides a first signal based on detecting a first condition relating to an indoor temperature and a second signal based on detecting a second condition relating to the indoor temperature. The compressor is operable at a first capacity and a second capacity that is greater than the first capacity based on one or more of the first signal and the second signal. The indoor fan is operable at a first speed and a second speed that is greater than the first speed based on one or more of the first signal and the second signal. The controller operates the compressor and the fan as follows. In response to the two stage thermostat asserting the first signal, the controller operates the compressor and the fan initially at the first capacity and the first speed and subsequently at the second capacity and the first speed. Thereafter, in response to the two stage thermostat asserting the second signal, the controller operates the compressor and the fan at the second capacity and the second speed. Thereafter, in response to the two stage thermostat de-asserting the second signal, the controller operates the compressor and the fan at the second capacity and the first speed until the first signal is de-asserted.

In some configurations, the two stage thermostat detects the first condition when the indoor temperature differs from a desired temperature setting of the two stage thermostat by a first amount. The two stage thermostat detects the second condition when the indoor temperature differs from the desired temperature setting of the two stage thermostat by a second amount.

In some configurations, the controller operates the compressor and the fan, in response to the two stage thermostat asserting the first signal, initially at the first capacity and the first speed for a predetermined time period and subsequently at the second capacity and the first speed based on an outdoor air temperature or other measured indicator of outdoor thermal load.

In some configurations, the two stage thermostat asserts the second signal in response to the indoor temperature differing from a desired temperature by greater than or equal to a predetermined amount after the compressor and the indoor fan have been operated respectively at the second capacity and the first speed for a predetermined time period.

In some configurations, the two stage thermostat asserts the second signal after the compressor and the indoor fan have been operated respectively at the second capacity and the first speed for a predetermined time period.

In some configurations, the two stage thermostat asserts the second signal for a predetermined time period and de-asserts the second signal after the predetermined time period.

In some configurations, the two stage thermostat asserts the second signal until the indoor temperature differs from a desired temperature by less than or equal to a predetermined amount and de-asserts the second signal after the indoor temperature differs from the desired temperature by less than or equal to the predetermined amount.

In some configurations, the controller turns off the compressor and the fan after the first signal is de-asserted.

In another form, a control system comprises a thermostat, a compressor, an indoor fan, and a controller. The thermostat provides a first signal in response to detecting a first demand for changing an indoor temperature by a first amount and a second signal in response to detecting a second demand for changing the indoor temperature by a second amount. The compressor is operable at a first capacity and a second capacity that is greater than the first capacity. The indoor fan is operable at a first speed and a second speed that is greater than the first speed. The controller operates the compressor and the fan as follows. In response to the thermostat asserting the first signal, the controller operates the compressor and the fan initially at the first capacity and the first speed and subsequently at the second capacity and the first speed. Then in response to the thermostat asserting the second signal, the controller operates the compressor and the fan at the second capacity and the second speed. Then in response to the thermostat de-asserting the second signal, the controller operates the compressor and the fan at the second capacity and the first speed until the first signal is de-asserted.

In some configurations, the thermostat detects the first demand when the indoor temperature differs from a desired temperature setting of the thermostat by the first amount. The thermostat detects the second demand when the indoor temperature differs from the desired temperature setting of the thermostat by the second amount.

In some configurations, the controller operates the compressor and the fan, in response to the thermostat asserting the first signal, initially at the first capacity and the first speed for a predetermined time period and subsequently at the second capacity and the first speed based on an outdoor air temperature or other measured indicator of outdoor thermal load.

In some configurations, the thermostat asserts the second signal in response to the indoor temperature differing from a desired temperature by greater than or equal to a predetermined amount after the compressor and the indoor fan have been operated respectively at the second capacity and the first speed for a predetermined time period.

In some configurations, the thermostat asserts the second signal after the compressor and the indoor fan have been operated respectively at the second capacity and the first speed for a predetermined time period.

In some configurations, the thermostat asserts the second signal for a predetermined time period de-asserts the second signal after the predetermined time period.

In some configurations, the thermostat asserts the second signal until the indoor temperature differs from a desired temperature by less than or equal to a predetermined amount and de-asserts the second signal after the indoor temperature differs from the desired temperature by less than or equal to the predetermined amount.

In some configurations, the controller turns off the compressor and the fan after the first signal is de-asserted.

In another form, a system comprises a compressor, an indoor fan, a thermostat, and a controller. The compressor is operable at a first capacity and a second capacity that is greater than the first capacity. The indoor fan is operable at a first speed and a second speed that is greater than the first speed. The thermostat provides a first signal for changing an indoor temperature by a first amount and a second signal for changing the indoor temperature by a second amount. The controller operates the compressor and the fan as follows. In response to the thermostat asserting the first signal, the controller operates the compressor and the fan initially at the first capacity and the first speed and subsequently at the second capacity and the first speed. Then in response to the thermostat asserting the second signal, the controller operates the compressor and the fan at the second capacity and the second speed until the second signal is de-asserted. Then the controller operates the compressor and the fan at the second capacity and the first speed until the first signal is de-asserted.

In some configurations, the controller operates the compressor and the fan, in response to the thermostat asserting the first signal, initially at the first capacity and the first speed for a predetermined time period and subsequently at the second capacity and the first speed based on an outdoor air temperature or other measured indicator of outdoor thermal load.

In some configurations, the thermostat asserts the second signal in response to the indoor temperature differing from a desired temperature by greater than or equal to a predetermined amount after the compressor and the indoor fan have been operated respectively at the second capacity and the first speed for a predetermined time period.

In some configurations, the thermostat asserts the second signal after the compressor and the indoor fan have been operated respectively at the second capacity and the first speed for a predetermined time period.

In some configurations, the thermostat asserts the second signal for a predetermined time period and de-asserts the second signal after the predetermined time period.

In some configurations, the thermostat asserts the second signal until the indoor temperature differs from a desired temperature by less than or equal to a predetermined amount and de-asserts the second signal after the indoor temperature differs from the desired temperature by less than or equal to the predetermined amount.

In some configurations, the controller turns off the compressor and the fan after the first signal is de-asserted.

In another form, a system comprises a compressor, an indoor fan, a thermostat, and a controller. The compressor is operable at a first capacity and a second capacity that is greater than the first capacity. The indoor fan is operable at a first speed and a second speed that is greater than the first speed. The thermostat provides a first signal for changing an indoor temperature by a first amount and a second signal for changing the indoor temperature by a second amount. The controller operates the compressor and the fan at the second capacity and the second speed in response to the thermostat asserting the second signal and asserting the first signal. Subsequently, the controller operates the compressor and the fan at the second capacity and the first speed in response to the thermostat de-asserting the second signal and asserting the first signal.

In some configurations, the controller operates the compressor and the fan at the second capacity and the first speed until the first signal is de-asserted and turns off the compressor and the fan after the first signal is de-asserted.

In some configurations, the controller operates the compressor and the fan at the second capacity and the first speed based on an outdoor air temperature or other measured indicator of outdoor thermal load.

In another form, a method for a compressor operable at a first capacity and a second capacity that is greater than the first capacity and an indoor fan operable at a first speed and a second speed that is greater than the first speed, comprises providing a first signal in response to detecting a first demand for changing an indoor temperature by a first amount and a second signal in response to detecting a second demand for changing the indoor temperature by a second amount. The method further comprises in response to the first signal being asserted, operating the compressor and the fan initially at the first capacity and the first speed and subsequently at the second capacity and the first speed, then in response to the second signal being asserted, operating the compressor and the fan at the second capacity and the second speed, and then in response to the second signal being de-asserted, operating the compressor and the fan at the second capacity and the first speed until the first signal is de-asserted.

In some configurations, the method further comprises operating the compressor and the fan, in response to the first signal being asserted, initially at the first capacity and the first speed for a predetermined time period and subsequently at the second capacity and the first speed based on an outdoor air temperature or other measured indicator of outdoor thermal load.

In some configurations, the method further comprises asserting the second signal in response to the indoor temperature differing from a desired temperature by greater than or equal to a predetermined amount after the compressor and the indoor fan have been operated respectively at the second capacity and the first speed for a predetermined time period.

In some configurations, the method further comprises asserting the second signal after the compressor and the indoor fan have been operated respectively at the second capacity and the first speed for a predetermined time period.

In some configurations, the method further comprises asserting the second signal for a predetermined time period and de-asserting the second signal after the predetermined time period.

In some configurations, the method further comprises asserting the second signal until the indoor temperature differs from a desired temperature by less than or equal to a predetermined amount, and de-asserting the second signal after the indoor temperature differs from the desired temperature by less than or equal to the predetermined amount.

In some configurations, the method further comprises turning off the compressor and the fan after the first signal is de-asserted.

In another form, a method for a compressor operable at a first capacity and a second capacity that is greater than the first capacity and an indoor fan operable at a first speed and a second speed that is greater than the first speed, comprises providing a first signal for changing an indoor temperature by a first amount and a second signal for changing the indoor temperature by a second amount. The method further comprises operating the compressor and the fan at the second capacity and the second speed in response to the second signal being asserted and the first signal being asserted. The method further comprises subsequently operating the compressor and the fan at the second capacity and the first speed in response to the second signal being de-asserting and the first signal being asserted.

In some configurations, the method further comprises operating the compressor and the fan at the second capacity and the first speed until the first signal is de-asserted, and turning off the compressor and the fan after the first signal is de-asserted.

In some configurations, the method further comprises operating the compressor and the fan at the second capacity and the first speed based on an outdoor air temperature or other measured indicator of outdoor thermal load.

In another form, a system comprises a compressor, an indoor fan, a thermostat, and a controller. The compressor is operable at a first capacity and a second capacity that is greater than the first capacity. The indoor fan is operable at a first speed and a second speed that is greater than the first speed. The thermostat provides a first signal for changing an indoor temperature by a first amount and a second signal for changing the indoor temperature by a second amount. The controller operates the compressor and the fan at the second capacity and the second speed in response to the thermostat asserting the first signal and the second signal, and in response to an outdoor air temperature or other measured indicator of outdoor thermal load being greater than or equal to a predetermined threshold. Subsequently, the controller operates the compressor and the fan at the second capacity and the first speed in response to the thermostat de-asserting the second signal while the first signal remains asserted.

In some configurations, the controller operates the compressor and the fan at the second capacity and the first speed until the first signal is de-asserted and turns off the compressor and the fan after the first signal is de-asserted.

In another form, a method for a compressor operable at a first capacity and a second capacity that is greater than the first capacity and an indoor fan operable at a first speed and a second speed that is greater than the first speed, comprises providing a first signal for changing an indoor temperature by a first amount and a second signal for changing the indoor temperature by a second amount. The method further comprises operating the compressor and the fan at the second capacity and the second speed in response to the first signal and the second signal being asserted, and in response to an outdoor air temperature or other measured indicator of outdoor thermal load being greater than or equal to a predetermined threshold. The method further comprises subsequently operating the compressor and the fan at the second capacity and the first speed in response to the second signal being de-asserted while the first signal remains asserted.

In some configurations, the method further comprises operating the compressor and the fan at the second capacity and the first speed until the first signal is de-asserted, and turning off the compressor and the fan after the first signal is de-asserted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a lookup table that can be used in the method and algorithm of FIG. 2;

FIG. 6 is a table illustrating relative sensible and latent loads for exemplary climate types;

FIG. 7 is a table providing data for a first climate type at various times of a day;

FIG. 8 is a table providing data for a second climate type at various times of a day;

FIG. 9 is a table providing data for a third climate type at various times of a day; and FIG. 10 is a table providing data for a fourth climate type at various times of a day.

Corresponding reference numerals indicate corresponding parts throughout the several views of the drawings.

DETAILED DESCRIPTION

Figure 1:
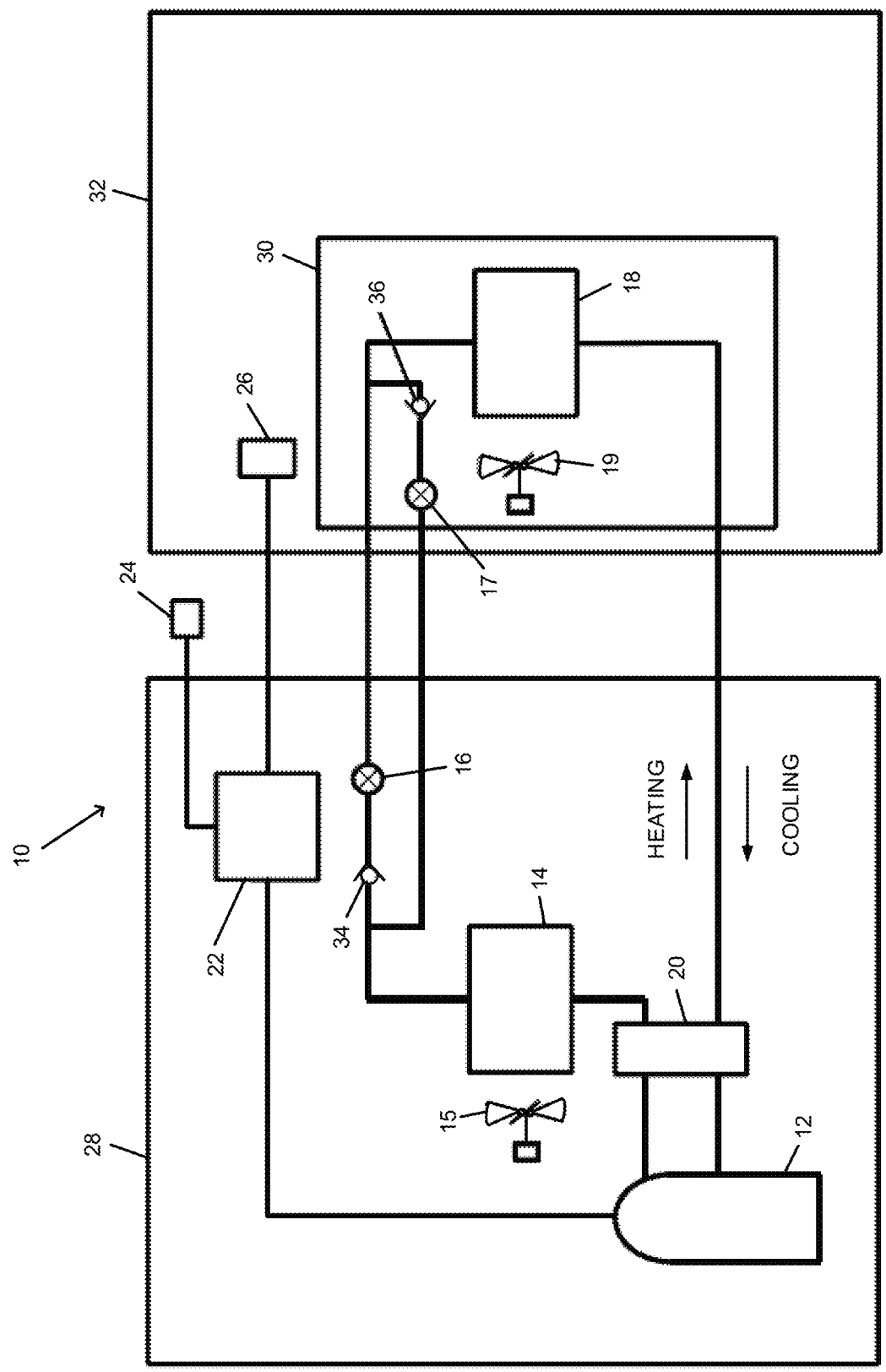
FIG. 1 is a schematic representation of a heat-pump system having a variable-capacity compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a variable-capacity compressor (or a variable-capacity group of compressors) 12, an outdoor heat exchanger 14, an outdoor blower 15, a first expansion device 16, a second expansion device 17, an indoor heat exchanger 18, and an indoor blower 19. In the particular configuration shown in FIG. 1, the system 10 is a heat-pump system having a reversing valve 20 operable to control a direction of working fluid flow through the system 10 to switch the system 10 between a heating mode and a cooling mode. In some configurations, the system 10 may be an air-conditioning system or a refrigeration system, for example, and may be operable in only the cooling mode.

As will be described in more detail below, a controller or control module 22 may control operation of the compressor 12 and may switch the compressor 12 between a low-capacity mode and a high-capacity mode based on data received from an outdoor-air-temperature sensor 24, a signal received from a thermostat 26, a comparison between a runtime T of the compressor 12 and a predetermined low-capacity runtime T1, and/or a comparison between a previous high-capacity runtime T2 with a predetermined value. The control module 22 may minimize or reduce employment of high-capacity-mode operation to minimize or reduce energy usage while maintaining an acceptable level of comfort within a space to be heated or cooled.

The compressor 12 can be or include a scroll compressor, a reciprocating compressor, or a rotary vane compressor, for example, and/or any other type of compressor. The compressor 12 may be any type of variable-capacity compressor that is operable in at least a low-capacity mode and a high-capacity mode. For example, the compressor 12 may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressor 12 could include any other additional or alternative structure for varying its capacity and/or the operating capacity of the system 10.

It will be appreciated that the low-capacity and/or high-capacity modes may be continuous, steady-state operating modes, or compressor 12 may be modulated (e.g., pulse-width-modulated) during operation in the low-capacity mode and/or during operation in the high-capacity mode. Exemplary variable-capacity compressors are disclosed in assignee's commonly owned U.S. Pat. Nos. 8,616,014, 6,679,072, 8,585,382, 6,213,731, 8,485,789, 8,459,053, and 5,385,453 the disclosures of which are hereby incorporated by reference.

The compressor 12, the outdoor heat exchanger 14, the outdoor blower 15, the first expansion device 16 and the reversing valve 20 may be disposed in an outdoor unit 28.

The second expansion device 17, the indoor heat exchanger 18 and the indoor blower 19 may be disposed within an indoor unit 30 (e.g., an air handler or furnace) disposed within a home or other building 32. A first check valve 34 may be disposed between outdoor heat exchanger 14 and the first expansion device 16 and may restrict or prevent fluid flow through the first expansion device 16 in the cooling mode and may allow fluid flow through the first expansion device 16 in the heating mode. A second check valve 36 may be disposed between the second expansion device 17 and the indoor heat exchanger 18 and may restrict or prevent fluid flow through the second expansion device 17 in the heating mode and may allow fluid flow through the second expansion device 17 in the cooling mode.

The outdoor-air-temperature sensor 24 is disposed outside of the building 32 and within or outside of the outdoor unit 28 and is configured to measure an outdoor ambient air temperature and communicate the outdoor ambient air temperature value to the control module 22 intermittently, continuously or on-demand. In some configurations, the outside-air-temperature sensor 24 could be a thermometer or other sensor associated with a weather monitoring and/or weather reporting system or entity. In such configurations, the control module 22 may obtain the outdoor-air temperature (measured by the sensor 24) from the weather monitoring and/or weather reporting system or entity via, for example, an internet, Wi-Fi, Bluetooth®, Zigbee®, power-line carrier communication (PLCC), or cellular connection or any other wired or wireless communication protocol.

For example, the control module 22 may communicate with the weather monitoring and/or weather reporting system or entity over the internet via a Wi-Fi connection to a Wi-Fi router located in or associated with the building 32. The thermostat 26 is disposed inside of the building 32 and outside of the indoor unit 30 and is configured to measure an air temperature within a room or space to be cooled or heated by the system 10. The thermostat 26 can be a single-stage thermostat, for example, that generates only one type of demand signal in response to a temperature within the room or spaced rising above (in the cooling mode) or falling below (in the heating mode) a setpoint temperature. The control module 22 could be disposed in any suitable location, such as inside of or adjacent to the outdoor unit 28 or inside of or adjacent to the indoor unit 30, for example.

Figure 11B:
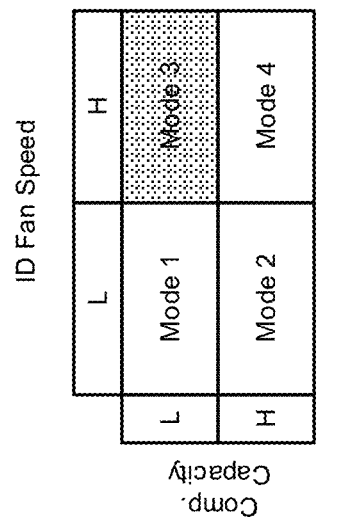
FIG. 11B depicts possible modes of operation of the two-stage climate control system of FIG. 11A.
Figure 11A:
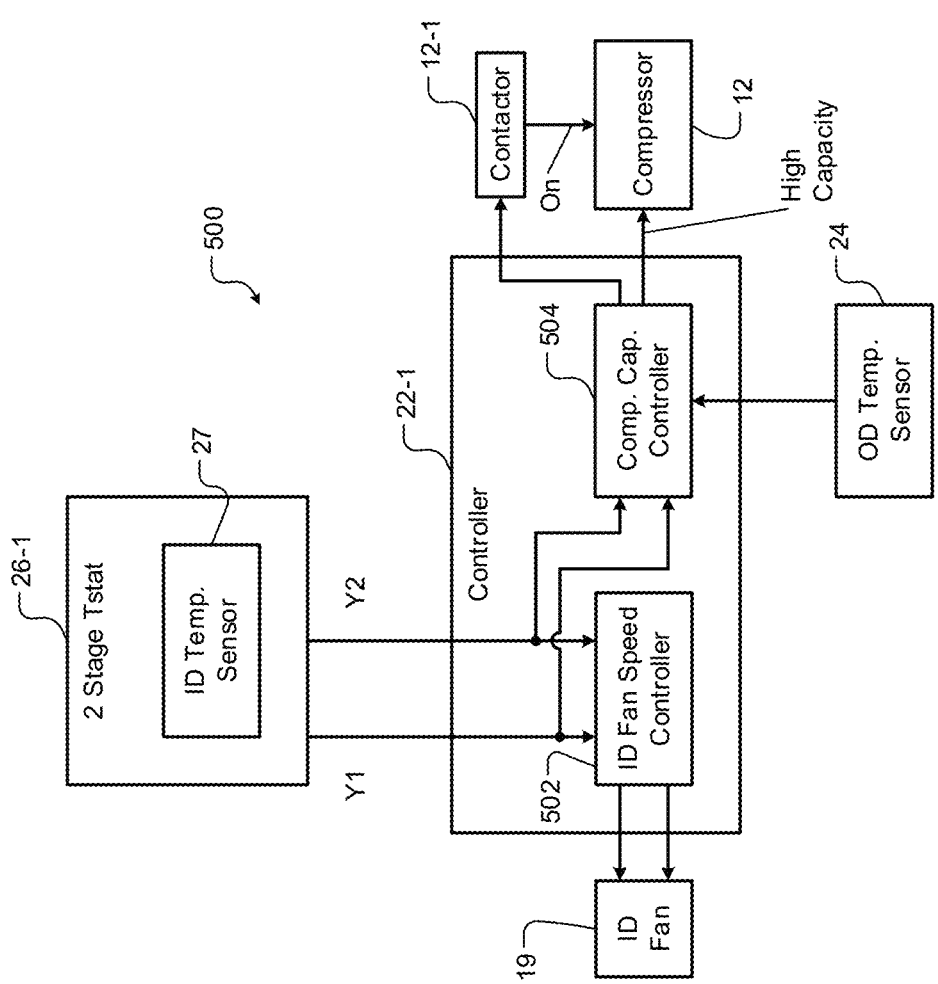
FIG. 11A is a schematic representation of a two-stage climate control system including a variable-capacity compressor, a variable speed indoor fan, and a two-stage thermostat according to the present disclosure.
Figure 11C:
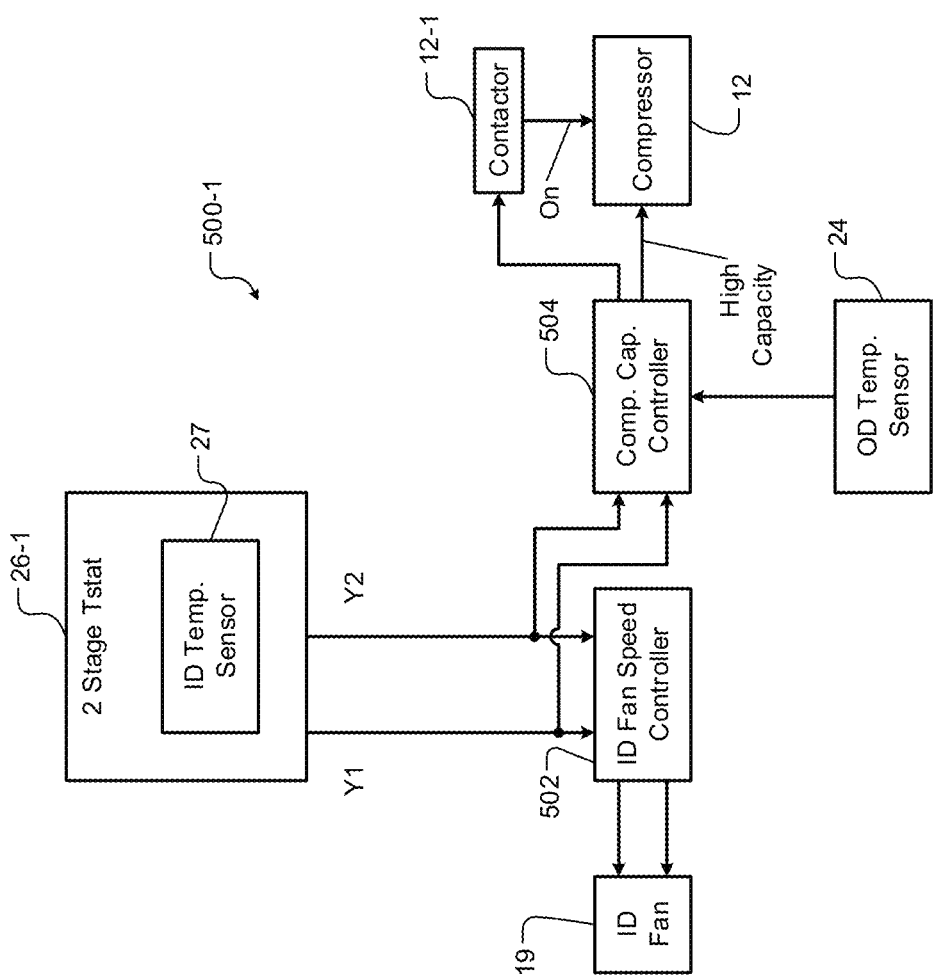
FIG. 11C is a schematic representation of a two-stage climate control system including a variable-capacity compressor, a variable speed indoor fan, and a two-stage thermostat with separate compressor capacity controller and indoor fan speed controller according to the present disclosure.

In some implementations, for example as shown in FIGS. 11A and 11C, the control module 22 may include two separate controllers: an indoor fan speed controller and a compressor capacity controller (see elements 504 and 502 in FIGS. 11A and 11C). For example, while not shown in FIG. 1, the outdoor unit 28 may include the compressor capacity controller 504, and the indoor unit 30 may include the indoor fan speed controller 502. Further, while not shown, it is understood that a contactor 12-1 (shown in FIGS. 11A and 11C) is associated with the compressor 12 and is controlled by the control module 22 or by the compressor capacity controller 504 to turn on the compressor 12.

In the cooling mode, the outdoor heat exchanger 14 may operate as a condenser or as a gas cooler and may cool discharge-pressure working fluid received from the compressor 12 by transferring heat from the working fluid to air forced over the outdoor heat exchanger 14 by the outdoor blower 15, for example. The outdoor blower 15 could include a fixed-speed, multi-speed or variable-speed fan. In the cooling mode, the indoor heat exchanger 18 may operate as an evaporator in which the working fluid absorbs heat from air forced over the indoor heat exchanger 18 by the indoor blower 19 to cool a space within the home or building 32. The indoor blower 19 could include a fixed-speed, multi-speed or variable-speed fan. In the heating mode, the outdoor heat exchanger 14 may operate as an evaporator, and the indoor heat exchanger 18 may operate as a condenser or as a gas cooler and may transfer heat from working fluid discharged from the compressor 12 to a space to be heated.

Figure 2:
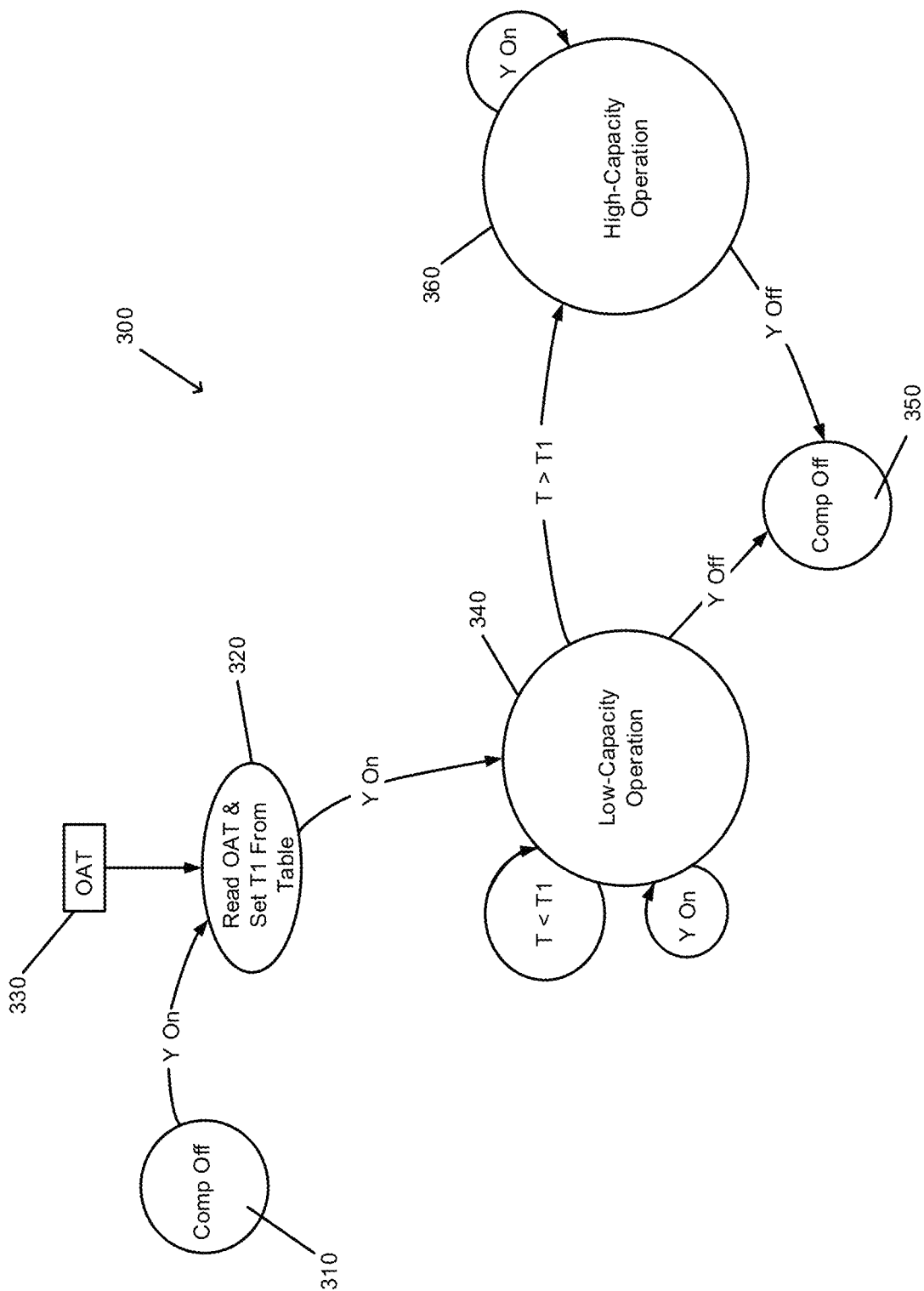
FIG. 2 is a state diagram illustrating another method and algorithm for controlling the variable-capacity compressor of FIG. 1.

Referring now to FIG. 2, a method and control algorithm 300 will be described that can be executed by the control module 22. The algorithm 300 may control operation of the compressor 12 and switch the compressor 12 between the low-capacity and high-capacity modes. In an initial state 310, the compressor 12 may be off. The thermostat 26 may send a demand signal Y to the control module 22 in response to an air temperature in the space to be heated or cooled by the system 10 dropping below (in the heating mode) or rising above (in the cooling mode) a selected setpoint temperature. In response to receipt of the demand signal Y, the control module 22 may initiate operation of the compressor 12 in the low-capacity mode (state 340) and simultaneously, at state 320, read an outdoor air temperature (received from sensor 24 at input 330) and set a low-capacity runtime T1 based on data from table 345 (FIG. 3). Thereafter, the compressor 12 may continue to run in the low-capacity mode until the cooling demand is satisfied (i.e., the temperature in the space to be cooled drops below the selected setpoint temperature as indicated by the thermostat 26 and the thermostat switches the demand signal Y to "off"), until the total runtime T of the compressor 12 since the receipt of the demand signal Y surpasses the low-capacity runtime T1 set at state 320, or until the compressor 12 or system 10 is manually shutdown or a diagnostic or protection algorithm overrides the algorithm 300.

If demand is satisfied before the total runtime T reaches the predetermined low-capacity runtime T1, the control module 22 may shutdown the compressor 12 (state 350). If the compressor 12 has been running for longer than the predetermined low-capacity runtime T1 without satisfying the demand, the control module 22 may switch the compressor 12 from the low-capacity mode to the high-capacity mode (state 360). The compressor 12 may continue to run in the high-capacity mode until the cooling demand is satisfied (or until the compressor 12 or system 10 is manually shutdown or a diagnostic or protection algorithm overrides the algorithm 100). When demand is satisfied, the control module 22 may shutdown the compressor 12 (state 350). When the compressor 12 is shut down after satisfying demand by operating in the high-capacity mode, the control module 22 may record the runtime T2 of the compressor 12 in the high-capacity mode and store the high-capacity runtime T2 in a memory module associated with the control module 22.

FIG. 3 depicts the table 345 from which the control module 22 determines the low-capacity runtime T1. First, the control module 22 determines from which row of the table 345 to read based on the outdoor ambient temperature (OAT) value received at input 330. That is, the row of the table 345 from which the control module 22 reads is the row having an OAT range that includes the OAT value received at input 330. If the control module 22 has not received a demand signal Y from the thermostat 26 in a relatively long predetermined period of time (e.g., days, weeks or longer), the control module 22 may initially set the low-capacity runtime T1 at a default or baseline value listed in the Baseline T1 column at the corresponding OAT row of table 345.

With the low-capacity runtime T1 set at the baseline value corresponding to the OAT at the time of the initiation of the demand signal Y, the control module 22 may cause the compressor 12 to run in the low-capacity mode (state 340) until demand is met or until the compressor runtime T surpasses the set low-capacity runtime T1. If demand has not been met when the runtime T reaches the set low-capacity runtime T1, the control module 22 may switch the compressor 12 to the high-capacity mode (state 360). The compressor 12 may continue operating in the high-capacity mode until demand is met. Once demand is met, the controller 22 may record in the high-capacity runtime T2, as described above.

Upon receipt of a subsequent demand signal Y, the control module 22 may again determine a low-capacity runtime value T1 from the table 345. This time, the control module 22 may determine if the OAT falls within one of a plurality of override ranges 347. For example, override ranges 347 in the cooling mode may include 85-90° F. and >90° F., and override ranges 347 in the heating mode may include 40-45° F. and <40° F. If the OAT value received at input 330 falls within one of the override ranges 347, the control module 22 may set the low-capacity runtime T1 at an override value determined by referencing the override T1 column at the corresponding OAT row.

The override value for the low-capacity runtime T1 may be determined based on a previous high-capacity runtime $T2_{n-1}$. For example, if the previous high-capacity runtime $T2_{n-1}$ is greater than a predetermine value (e.g., five minutes), the control module 22 may set the low-capacity runtime T1 to a first value (e.g., a short time period such as five seconds). If the previous high-capacity runtime $T2_{n-1}$ is less than the predetermine value (e.g., five minutes), the control module 22 may set the low-capacity runtime T1 to a second value (e.g., a longer time period such as twenty minutes or forty minutes). The control module 22 may then cause the compressor 12 to run in the low-capacity mode (state 340) until demand is met or until the compressor runtime T reaches the low-capacity runtime T1, at which time the control module 22 may switch the compressor to the high-capacity mode (state 360).

If the OAT falls within an OAT range that is not one of the override ranges 347, then the control module 22 will continue to set the low-capacity runtime T1 at the baseline value listed in the baseline T1 column. As described above, the control module 22 may cause the compressor 12 to run in the low-capacity mode until demand is met or until the compressor runtime T reaches the low-capacity runtime T1, at which time the control module 22 may switch the compressor 12 to the high-capacity mode until demand is met.

In another configuration, the algorithm 300 may include determining the low-capacity runtime T1 based on table 445 (FIG. 4) instead of table 345. As described above, the control module 22 may continuously or intermittently receive OAT data from the sensor 24 and may store the OAT data in a memory module. As described above, once the demand signal Y is received, the control module 22 may, at state 320, read the current OAT (from input 330) and set the low-capacity runtime T1 from the table 445.

If the control module 22 has not received a demand signal Y from the thermostat 26 in a relatively long predetermined period of time (e.g., days, weeks or longer), the control module 22 may initially set the low-capacity runtime T1 at a default or baseline value listed in Baseline T1 column 446 at the OAT row of table 445 that corresponds to the current OAT received at input 330. With the low-capacity runtime T1 set at the baseline value, the control module 22 may then cause the compressor 12 to operate in the low-capacity mode (state 340) until demand is met, or until the compressor runtime T reaches the set low-capacity runtime T1, at which time the control module 22 will run the compressor 12 in the high-capacity mode (state 360) until demand is met, in accordance with the algorithm 300 described above. The control module 22 may record the high-capacity runtime T2 for each run cycle of the compressor 12.

Upon receipt of a subsequent demand signal Y, the control module 22 may again determine a low-capacity runtime value T1 from the table 445. This time, the control module 22 may read the current OAT and determine a slope of the OAT over a predetermined time period (e.g., over the last twenty minutes, but may be any predetermined period of time that is suitably indicative of system conditions). If the OAT slope is within a neutral slope range (where the slope is greater than −0.3 degrees per 20 minutes and less than 0.3 degrees per 20 minutes, for example), then the control module 22 may set the low-capacity runtime T1 at the baseline value listed in the Baseline T1 column 446 at the OAT row of table 445 that corresponds to the current OAT. If the OAT slope is within a positive slope range (where the slope is greater than 0.3 degrees per 20 minutes, for example), then the control module 22 may set the low-capacity runtime T1 at the value listed in the Positive OAT Slope column 447 at the OAT row of table 445 that corresponds to the current OAT. If the OAT slope is within a first negative slope range (where the slope is less than −0.3 degrees per 20 minutes and greater than −0.6 degrees per 20 minutes, for example), then the control module 22 may set the low-capacity runtime T1 at the value listed in the Negative OAT Slope column 448 at the OAT row of table 445 that corresponds to the current OAT. If the OAT slope is within a second negative slope range (where the slope is less than −0.6 degrees per 20 minutes, for example), then the control module 22 may set the low-capacity runtime T1 at the value listed in the Extreme Negative OAT Slope column 449 at the OAT row of table 445 that corresponds to the current OAT.

While the OAT slope is described above as being determined over a predetermined time period, the OAT slope could also be determined by comparing OAT values at the beginning of a current compressor operating cycle (i.e., when the current demand signal Y is received) and at the end of the previous compressor operating cycle (i.e., when the last demand signal Y switched off). Still other methods for determining the OAT slope could be employed.

Figure 4:
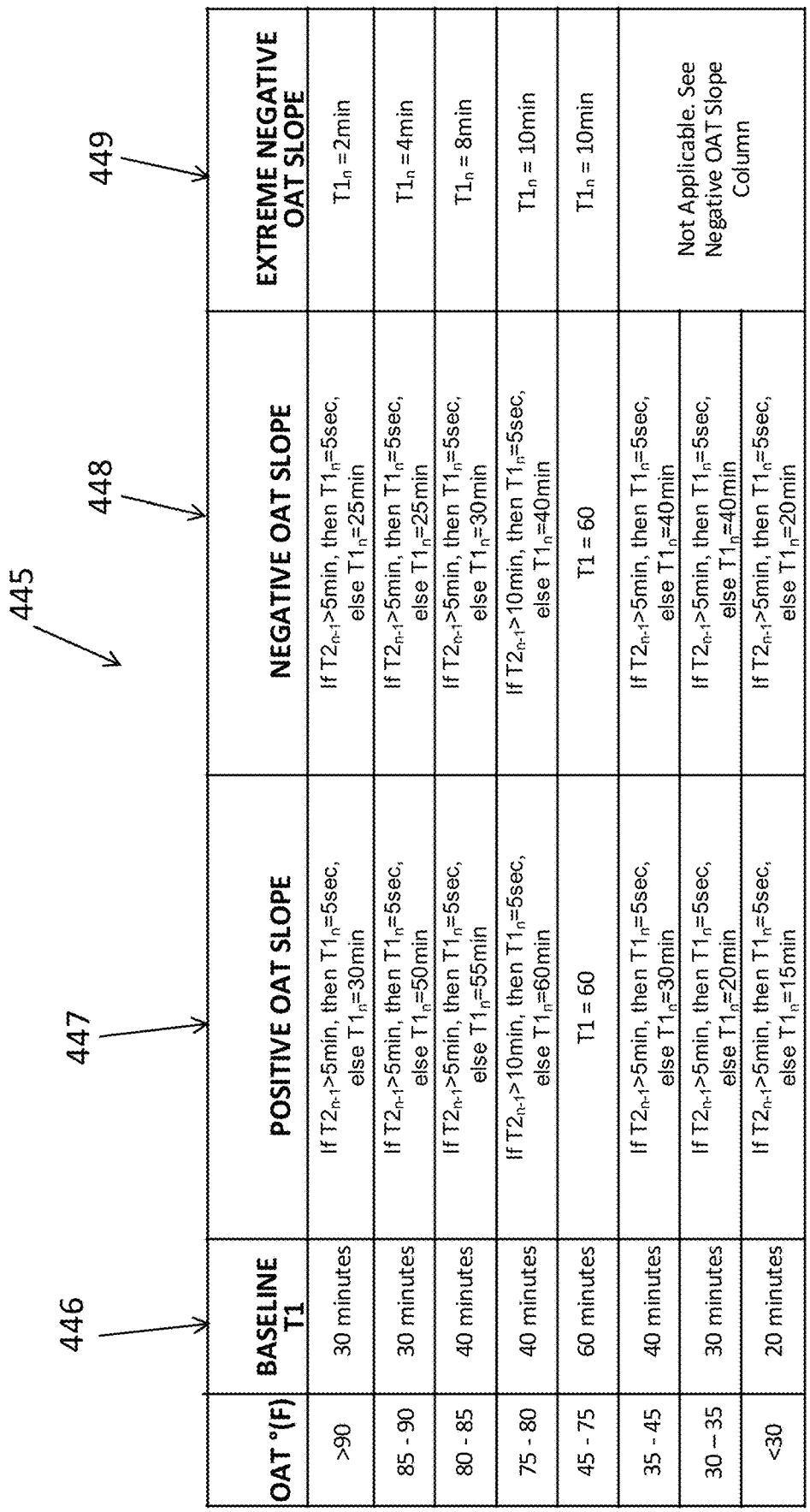
FIG. 4 is another lookup table that can be used in the method and algorithm of FIG. 2.

As shown in FIG. 4, some or all of the rows of column 447 and column 448 include steps for determining the low-capacity runtime T1 based on the previous high-capacity runtime $T2_{n-1}$ (i.e., the high-capacity runtime T2 of the previous run cycle in which the demand signal Y was constantly on or demand for heating or cooling was constantly present). For example, in the row of the Positive OAT Slope column 447 corresponding to an OAT of greater than 90° F.: if the previous high-capacity runtime $T2_{n-1}$ was greater than five minutes, then the current low-capacity runtime $T1n$ should be set to five seconds; and if the previous high-capacity runtime $T2_{n-1}$ was less than or equal to five minutes, then the current low-capacity runtime $T1_n$ should be set to thirty minutes. As shown in FIG. 4, the above time and temperature values may vary for the various rows of columns 447 and 448.

Further, as shown in FIG. 4, the Extreme Negative OAT Slope column 449 may simply include predetermined values for each OAT range that may not be dependent upon a previous high-capacity runtime. In some configurations, the Extreme Negative OAT Slope column 449 may refer the algorithm to the Negative OAT Slope column 448 for colder OAT ranges (e.g., below 45° F.). For example, if the OAT slope is less than −0.6 degrees per 20 minutes and the current OAT is less than 45° F., the control module 22 may set the low-capacity runtime T1 in accordance with the Negative OAT Slope column 448.

After setting the low-capacity runtime T1 in accordance with table 445, the control module 22 may operate the compressor 12 in the low-capacity mode (state 340) until demand is met, or until the compressor runtime T reaches the set low-capacity runtime T1 (at which time the control module 22 will switch the compressor to the high-capacity mode until demand is met), in accordance with the algorithm 300 described above.

OAT slope is generally a good indicator or estimate of the time of day. Therefore, adjusting low-capacity and high-capacity runtimes based on OAT slope effectively adjusts low-capacity and high-capacity runtimes to account for the diurnal temperature profile. That is, during the course of a day, the OAT often changes according to a fairly standard profile. When the OAT is rising in the morning, the total compressor runtime T is typically shorter (during the cooling season) than when the OAT is falling in the evening because the house or building in which the system 10 is installed has accumulated a thermal load throughout the day that is still present in the evening. For the heating mode, the load shifts to early morning, i.e., more high-capacity runtime during positive slope periods or early morning part of day, and less low-capacity runtime during negative slope periods or evenings, since the house or building absorbs heat during the day. Therefore, adjusting the low-capacity and high-capacity runtimes based on OAT slope or time of day accounts for the thermal load on the house or building and increases comfort for the occupants.

Figure 5:
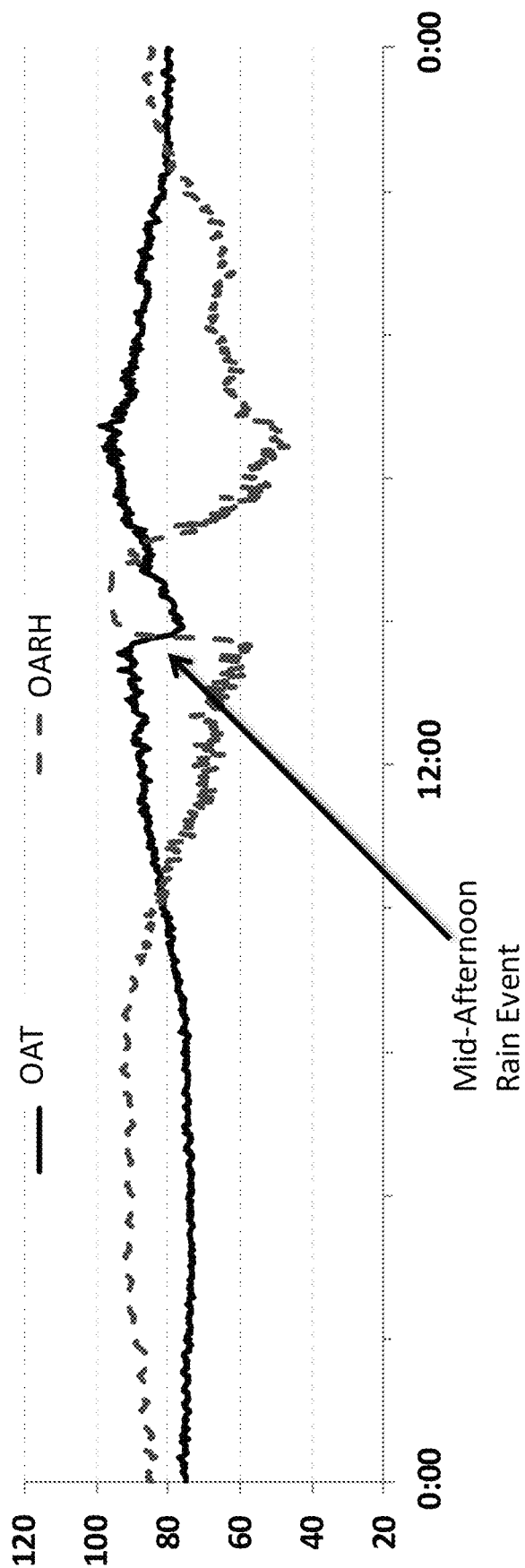
FIG. 5 is a graph depicting outdoor ambient temperature and outdoor ambient relative humidity versus time of day for an exemplary geographical location.

Furthermore, outdoor ambient relative humidity (OARH) often rises as OAT decreases and falls as OAT increases (as shown in FIG. 5). Therefore, OAT slope also indicates or approximates the slope of OARH. Thus, extreme negative OAT slopes (e.g., OAT slope less than −0.6 degrees per 20 minutes) can indicate an increased demand for dehumidification due to a mid-afternoon rain event, for example. Therefore, determining the OAT slope and adjusting low-capacity and high-capacity runtimes based on the OAT slope allows the algorithm 300 to account for the thermal load of the house or building and thermal load delay due to diurnal profile and allows the algorithm 300 to account for slope of ambient relative humidity without the use of a relative humidity sensor.

FIG. 5 depicts the OAT and OARH profile for a given day at a given location. As shown in FIG. 5, a mid-afternoon rain event can be accompanied by a sharp decrease in OAT and a corresponding sharp increase in OARH. Therefore, even though the OAT has decreased as a result of the rain event, demand for cooling may remain high due to the increased humidity and the possibility of OAT returning to its previous high before sunset. Therefore, such events having an extreme negative OAT slope are accounted for in table 445 (FIG. 4) at the Extreme Negative OAT Slope column 449, which assigns a very short low-capacity runtime T1 regardless of the length of any previous high-capacity runtime.

As described above, the indoor blower 19 (FIG. 1) could be a multi-speed blower that can be set at two or more speeds. Therefore, the system 10 may be operable in at least four different modes. In a first mode, the compressor 12 may operate in the low-capacity mode, and the indoor blower 19 may operate at a low speed. In a second mode, the compressor 12 may operate in the low-capacity mode, and the indoor blower 19 may operate at a high speed. In a third mode, the compressor 12 may operate in the high-capacity mode, and the indoor blower 19 may operate at the low speed. In a fourth mode, the compressor 12 may operate in the high-capacity mode, and the indoor blower 19 may operate at the high speed.

In some configurations, the speed of the indoor blower 19 may be set manually (e.g., by an installation contractor) and thereafter, the speed of the indoor blower 19 may be fixed at that speed. The speed of the indoor blower 19 could be selected based on the climate of the region (specifically, temperatures and humidity levels) in which the system 10 is installed. For example, as shown in FIG. 6, in regions with hot and humid climates (e.g., sub-tropical and tropical climates), the indoor blower 19 may be set to the low setting because lower indoor blower speeds are advantageous for faster dehumidification. In regions with very hot and dry climates (e.g., desert climates like the Southwest United States), the indoor blower 19 may be set to the high setting because higher indoor blower speeds are more advantageous for quickly reducing sensible heat. In regions with mixed temperatures and mild humidity, the indoor blower 19 may be set to the low or medium setting. In regions with mixed temperatures and higher humidity, the indoor blower 19 may be set to the low setting.

In the configurations in which the speed of the indoor blower 19 is set at installation and is fixed thereafter, the system 10 (having variable-capacity compressor 12) can be modulated between two modes: either between the first and third modes described above or between the second and fourth modes described above.

In other configurations, the control module 22 may be in communication with the indoor blower 19 and may be configured to modulate the speed of the indoor blower 19. In such configurations, the control module 22 may be configured to switch the system 10 among the first, second, third and fourth modes (i.e., by modulating the compressor 12 between the low-capacity and high-capacity modes and by modulating the indoor blower 19 between high and low speeds). The control module 22 may switch among the first, second, third and fourth modes depending on OAT, OAT slope, time of day, low-capacity and high-capacity runtimes T1, T2, indoor relative humidity, outdoor relative humidity, historical weather data and/or forecasted weather data, for example.

It will be appreciated that the tables 345 and 445 and runtimes T1, T2 could also be adjusted based on the climate of the region in which the system 10 is installed. FIGS. 7-10 provide overviews of the exemplary regions of FIG. 6 including low-capacity/high-capacity (Y1/Y2) compressor settings, OAT slopes, sensible loads and latent loads at various times of the day.

In other configurations, a two-stage system may include a variable capacity compressor such as the compressor 12 and a variable speed indoor fan such as the indoor blower 19 shown in FIG. 1 and a two-stage thermostat 26-1 shown in FIG. 11A and described below. The two-stage thermostat 26-1 can provide two control signals, which are referenced herein as a first control signal Y1 and a second control signal Y2. The first control signal Y1 is similar to the demand signal Y described above with reference to FIGS. 1-10. The two-stage thermostat 26-1 generates the second control signal Y2 when the indoor load cannot be matched by operating the compressor 12 in the high-capacity mode (e.g., when more than normal sensible cooling is needed).

The two-stage system operates as described above with reference to FIGS. 1-10 as long as the two-stage thermostat 26-1 asserts only the first control signal Y1. Specifically, when only the first control signal Y1 is asserted, the two-stage system selects an operating mode of the compressor 12 (i.e., low or high-capacity mode) based on the outdoor ambient temperature (OAT) and switches the operating mode of the compressor 12 to the high-capacity mode when the runtime of the compressor 12 in the low-capacity mode is exceeded. Additionally, when only the first control signal Y1 is asserted, the indoor blower 19 (hereinafter the indoor fan 19) is operated only at a low speed although the compressor 12 is operated in both low and high-capacity modes. The indoor fan 19 is operated at a high speed only during the time period when the second control signal Y2 is asserted.

When the two-stage thermostat 26-1 asserts the second control signal Y2 (either after Y1 is asserted or independently of Y1 (i.e., when Y1 is not first asserted as explained below), the two-stage system suspends or overrides normal operation described above with reference to FIGS. 1-10 and immediately switches the operation of the compressor 12 to the high-capacity mode. Additionally, the two-stage system switches the speed of the indoor fan 19 to the high speed.

Thereafter, if the two-stage thermostat 26-1 determines that the second control signal Y2 is no longer needed (e.g., after a period of time when the indoor load is sufficiently reduced), the two-stage thermostat 26-1 de-asserts or withdraws the second control signal Y2 and the first control signal Y1 remains asserted. When the second control signal Y2 is de-asserted, the speed of the indoor fan 19 is switched to the low speed. However the compressor 12 continues to operate in the high-capacity mode until the first control signal Y1 is de-asserted, at which point both the compressor 12 and the indoor fan 19 are turned off.

FIGS. 11A and 11B depict an example of a two-stage system 500 including the variable capacity compressor such as the compressor 12, a variable speed indoor fan such as the indoor fan 19, and the two-stage thermostat 26-1. In FIG. 11A, the two-stage system 500 includes a controller 22-1 that controls the compressor 12 (and an associated contactor 12-1) and the indoor fan 19 based on the first control signal Y1 and the second control signal Y2 received from the two-stage thermostat 26-1 and a signal indicating the OAT received from the outdoor temperature sensor 24 as follows.

The controller 22-1 includes an indoor fan speed controller 502 and a compressor capacity controller 504. The indoor fan speed controller 502 and the compressor capacity controller 504 receive the first control signal Y1 and the second control signal Y2 received from the two-stage thermostat 26-1. The compressor capacity controller 504 also receives a signal from the outdoor temperature sensor 24 indicating OAT.

When only the first control signal Y1 is asserted and the second control signal Y2 is not asserted, the controller 22-1 operates the compressor 12 and the indoor fan 19 as described above with reference to FIGS. 1-10. As explained below, the indoor fan speed controller 502 controls the speed of the indoor fan 19 based on the first and second control signals Y1 and Y2; and the compressor capacity controller 504 controls the operating mode of the compressor 12 based on the following: the first and second control signals Y1 and Y2, the outdoor ambient temperature (OAT), and the indoor load determined by the two-stage thermostat 26-1 based on the indoor temperature sensed by a temperature sensor 27.

FIG. 11B shows 4 possible modes in which the two-stage system 500 can operate. When the two-stage system 500 operates in mode 1, the compressor 12 operates in the low-capacity mode, and the indoor fan 19 operates at the low speed. When the two-stage system 500 operates in mode 2, the compressor 12 operates in the high-capacity mode, and the indoor fan 19 operates at the low speed. When the two-stage system 500 operates in mode 4, the compressor 12 operates in the high-capacity mode, and the indoor fan 19 operates at the high speed. In some configurations, the two-stage system 500 may not operate in mode 3, where the compressor 12 may operate in the low-capacity mode, and the indoor fan 19 may operate in the high speed.

FIG. 11C shows another example of the two-stage system 500 (shown as 500-1), wherein the indoor fan speed controller 502 and the compressor capacity controller 504 are physically separate units.

Figure 12:
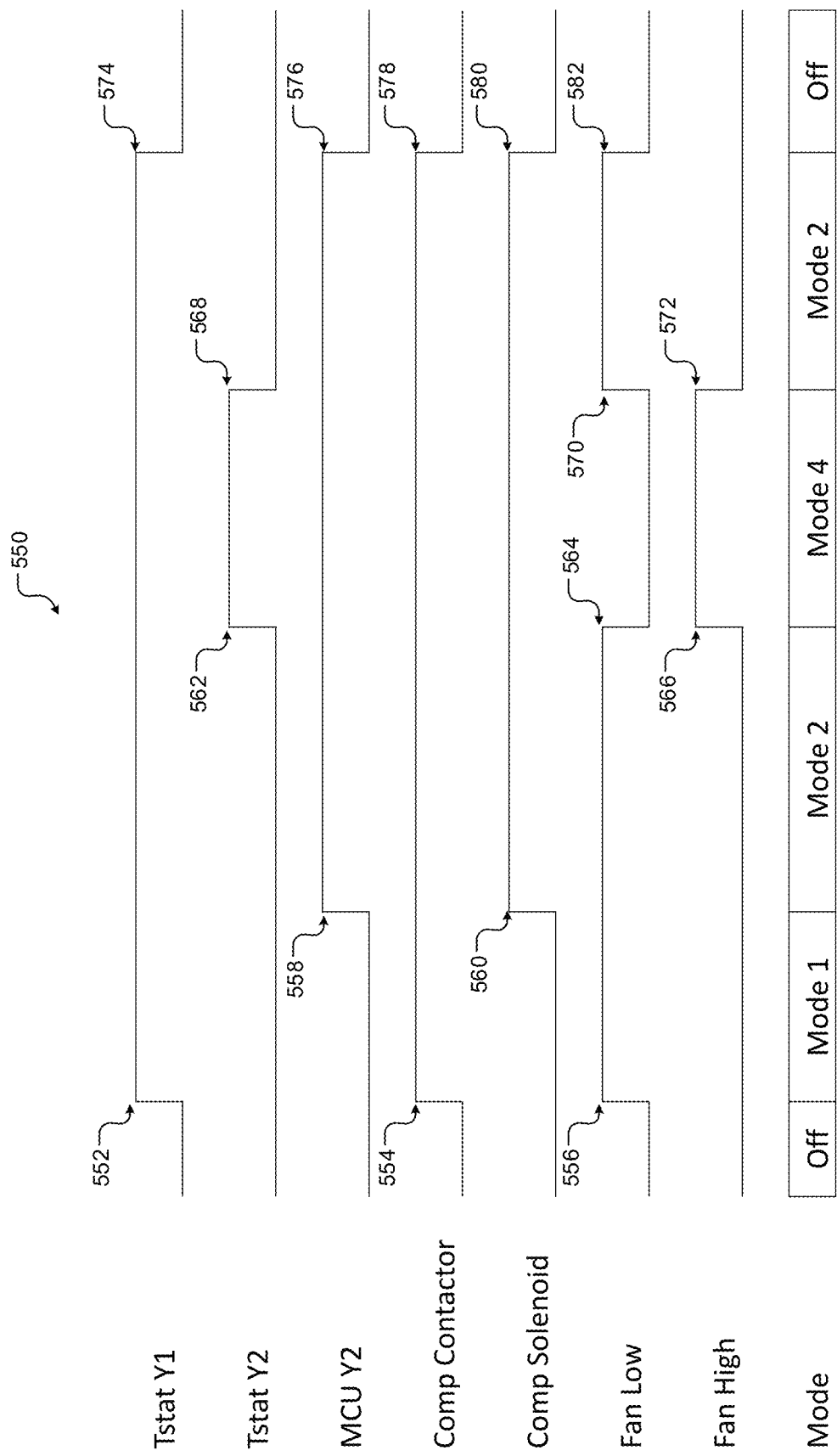
FIG. 12 shows a timing diagram of the two-stage climate control system of FIG. 11A.

FIG. 12 shows a timing diagram 550 of the two-stage system 500. The operation of the two-stage system 500 is now described with reference to the timing diagram 550. The same description applies to the two-stage system 500-1 as well. Initially, that is before 552, the compressor 12 and the indoor fan 19 are turned off. At 552, the two-stage thermostat 26-1 asserts the first control signal Y1 based on detecting a first condition relating to the indoor temperature. For example, the two-stage thermostat 26-1 asserts the first control signal Y1 based on detecting a first demand for changing the indoor temperature by a first amount when the indoor temperature differs from a desired temperature setting on the two-stage thermostat 26-1 by the first amount. At this point (i.e. at 552), the second control signal Y2 remains de-asserted.

When only the first control signal Y1 is asserted at 552, the compressor capacity controller 504 activates the compressor contactor at 554, which turns on the compressor 12 in the low-capacity mode. Additionally, the indoor fan speed controller 502 turns on the indoor fan 19 at the low speed at 556. Accordingly, the two-stage system 500 operates in mode 1 at 552 (i.e., the compressor 12 operates in the low-capacity mode, and the indoor fan 19 operates at the low speed).

Thereafter, as long as the two-stage thermostat 26-1 does not assert (i.e., until the two-stage thermostat 26-1 asserts) the second control signal Y2, the two-stage system 500 operates normally as described above with reference to FIGS. 1-10 based on the outdoor ambient temperature (OAT) indicated by the signal from the outdoor temperature sensor 24. Accordingly, the compressor capacity controller 504 switches the operating mode of the compressor 12 to the high-capacity mode at 558 (by activating a compressor solenoid or a suitable mechanism at 560) when the runtime of the compressor 12 in the low-capacity mode is exceeded. The run time of the compressor 12 in the low-capacity mode may be a first predetermined time period (from 552 to 558) that can be selected as described above with reference to FIGS. 1-10. The indoor fan 19 continues to operate at the low speed. Accordingly, the two-stage system 500 operates in mode 2 at 558 (i.e., the compressor 12 operates in the high-capacity mode, and the indoor fan 19 operates at the low speed).

At 562, the two-stage thermostat 26-1 asserts the second control signal Y2 based on detecting a second demand for changing the indoor temperature by a second amount when the indoor temperature differs from a desired temperature setting on the two-stage thermostat 26-1 by the second amount. For example, after the compressor 12 and the indoor fan 19 have been running respectively in the high-capacity mode and the low speed for a second predetermined period of time (from 558 to 562), the two-stage thermostat 26-1 may determine that the indoor load is still significantly high or that the indoor load is not reducing at a desired rate. That is, the two-stage thermostat 26-1 may determine that the temperature difference between the indoor temperature and the desired temperature setting on the on the two-stage thermostat 26-1 is still greater than or equal to a predetermined amount. Accordingly, the two-stage thermostat 26-1 may assert the second control signal Y2 at 562.

As soon as the second control signal Y2 is asserted at 562, the indoor fan speed controller 502 switches the speed of the indoor fan 19 to the high speed as shown at 564 and 566 to help reduce the indoor load at a faster rate. That is, the indoor fan speed controller 502 switches the speed of the indoor fan 19 to reduce the difference between the indoor temperature and the desired temperature setting on the on the two-stage thermostat 26-1 to less than or equal to a predetermined amount. The compressor capacity controller 504 keeps the compressor 12 running in the high-capacity mode at 562. Accordingly, the two-stage system 500 operates in mode 4 (i.e., the compressor 12 operates in the high-capacity mode, and the indoor fan 19 operates at the high speed).

The two-stage thermostat 26-1 keeps the second control signal Y2 asserted for a third predetermined period of time (from 562 to 568) and de-asserts the second control signal Y2 at 568 after the third predetermined time period. The two-stage thermostat 26-1 keeps the second signal Y2 asserted until the indoor temperature differs from the desired temperature by less than or equal to a predetermined amount and de-asserts the second signal Y2 after the indoor temperature differs from the desired temperature by less than or equal to the predetermined amount at 568.

As soon as the second control signal Y2 is de-asserted at 568, the indoor fan speed controller 502 switches the speed of the indoor fan 19 to the low speed as shown at 570 and 572. The compressor capacity controller 504 keeps the compressor 12 running in the high-capacity mode at 568. Accordingly, the two-stage system 500 operates in mode 2 (i.e., the compressor 12 operates in the high-capacity mode, and the indoor fan 19 operates at the low speed).

At 574, the two-stage thermostat 26-1 detects that the indoor temperature is equal to the desired temperature setting on the two-stage thermostat 26-1. Accordingly, the two-stage thermostat 26-1 de-asserts the first control signal Y1. As soon as the first control signal Y1 is de-asserted, the indoor fan speed controller 502 and the compressor capacity controller 504 respectively turn off the indoor fan 19 and the compressor 12 as shown at 576 through 582. The operation from 552 through 582 is repeated based on the first and second control signals Y1 and Y2 and the OAT sensed by the outdoor temperature sensor 24.

In some instances, the indoor load may change drastically, suddenly, or unexpectedly due to unusual events. For example, an occupant of a house, of which the climate is being controlled by the two-stage system 500, may open a window or door for an extended period of time; one or more occupants of the house may take extended showers or clean carpeting; many people may attend a party at the house; and so on. As another example, a person may enter the house after experiencing harsher temperatures (e.g., extreme heat or cold) outside than inside the house and therefore may drastically change the desired temperature setting on the two-stage thermostat 26-1 (e.g., to much lower than normal setting for faster cooling or much greater than normal setting for faster heating). As yet another example, the two-stage thermostat 26-1 may include a setback feature that allows for different temperature settings at different time periods. For example, if the house is unoccupied during the day, the two-stage thermostat 26-1 may be set such that the indoor temperature is warmer during days than nights in summer and cooler during days than nights in winter. Additionally, the two-stage thermostat 26-1 may allow different settings on weekends than weekdays when occupants stay indoors during the day.

In such instances, the two-stage thermostat 26-1 may detect a sudden, greater than normal increase in the indoor load due to one or more unusual events of the kind described above and in response may assert the second control signal Y2 instead of, and/or in addition to, asserting the first control signal Y1. As soon as the second control signal Y2 is asserted, the compressor capacity controller 504 turns on and operates the compressor 12 directly in the high-capacity mode, and the indoor fan speed controller 502 turns on and operates the indoor fan 19 directly at the high speed.

Accordingly, the two-stage system 500 operates in mode 4 (i.e., the compressor 12 operates in the high-capacity mode, and the indoor fan 19 operates at the high speed). After a predetermined time period, when a difference between the indoor temperature and the desired temperature setting on the two-stage thermostat 26-1 is less than or equal to a predetermined amount (i.e., when the indoor load is reduced to less than or equal to a predetermined amount), the two-stage thermostat 26-1 de-asserts the second control signal Y2 and asserts the first control signal Y1.

As soon as the second control signal Y2 is de-asserted and the first control signal Y1 is asserted, the compressor capacity controller 504 keeps operating the compressor 12 in the high-capacity mode, and the indoor fan speed controller 502 switches the speed of the indoor fan 19 to the low speed. Accordingly, the two-stage system 500 operates in mode 2 (i.e., the compressor 12 operates in the high-capacity mode, and the indoor fan 19 operates at the low speed).

Thereafter, when the two-stage thermostat 26-1 detects that the indoor temperature is equal to the desired temperature setting on the two-stage thermostat 26-1, the two-stage thermostat 26-1 de-asserts the first control signal Y1. As soon as the first control signal Y1 is de-asserted, the indoor fan speed controller 502 and the compressor capacity controller 504 respectively turn off the indoor fan 19 and the compressor 12. Subsequently, the operation from 552 through 582 shown in and described with reference to FIG. 12 is repeated based on the first and second control signals Y1 and Y2 and the OAT sensed by the outdoor temperature sensor 24.

Thus, the two-stage system 500 can perform climate control based on monitoring of a combination of the outdoor and indoor loads/temperatures. Additionally, the two-stage system 500 may provide a system override feature based on the second control signal Y2 provided by the two-stage thermostat. The two-stage system 500 provides both latent cooling and sensible cooling benefits, where latent cooling corresponds to humidity reduction, and sensible cooling corresponds to heat removal. The two-stage system 500 provides latent cooling through mode 2 operation, where the compressor is operated in the high-capacity mode and the indoor fan is operated at the low speed, which helps in reducing humidity. The two-stage system 500 provides sensible cooling through mode 4 operation, where the compressor is operated in the high-capacity mode and the indoor fan is operated at the high speed, which helps in fast heat removal.

Figure 13A:
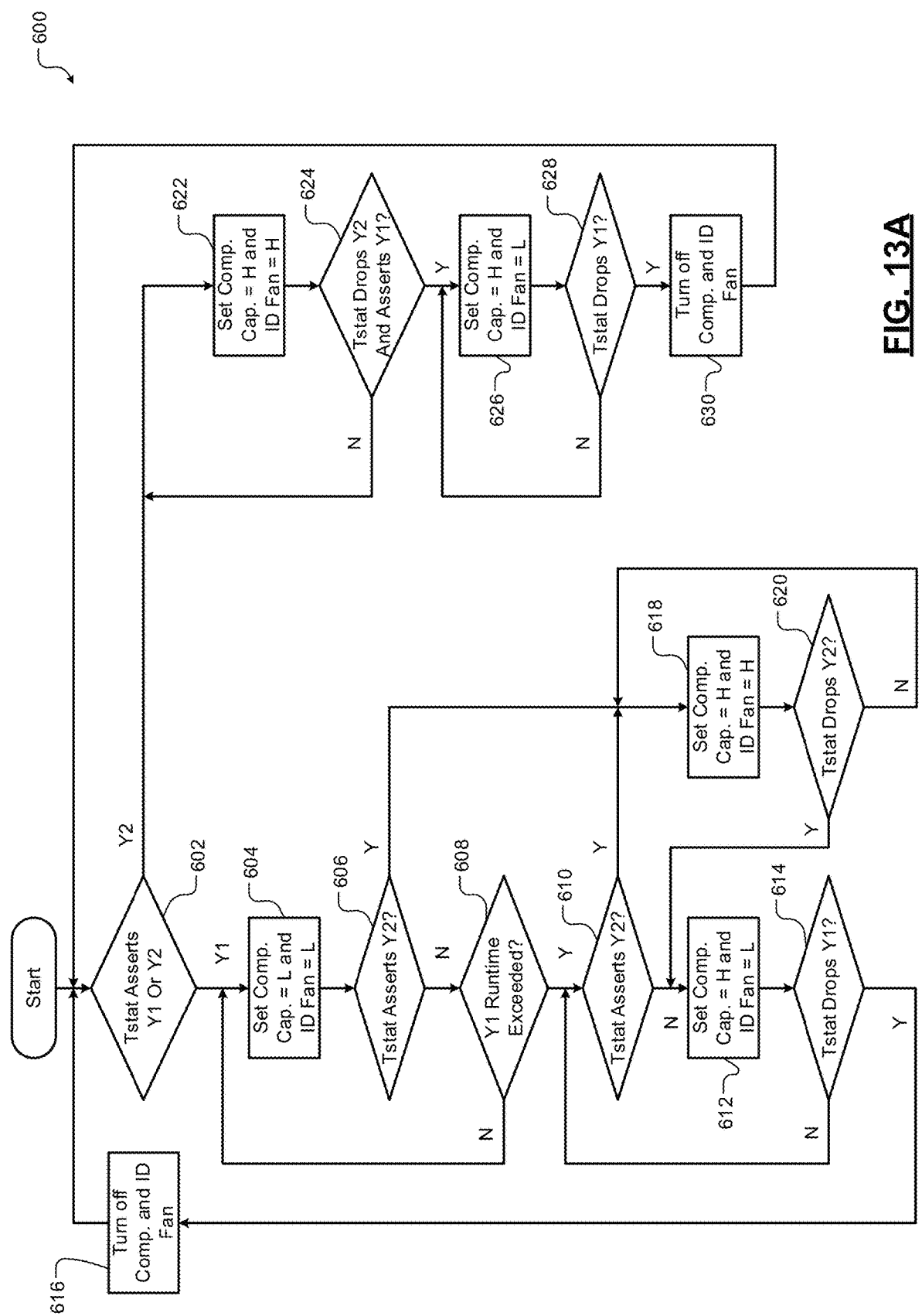
FIG. 13A is a flowchart of a method for operating the two-stage climate control system of FIGS. 11A and 11C.

FIG. 13A shows a method 600 for operating a two-stage system (e.g., the two-stage systems 500 and 500-1) including a variable capacity compressor such as the compressor 12, a variable speed indoor fan such as the indoor fan 19, and a two-stage thermostat such as the two-stage thermostat 26-1. At 602, with the compressor and the indoor fan initially being turned off, control determines whether the two-stage thermostat asserts the first control signal Y1 or the second control signal Y2.

At 604, in response to the first control signal Y1 being asserted and the second control signal Y2 not being asserted, control turns on the compressor 12 and the indoor fan 19 and operates the compressor in the low-capacity mode and the indoor fan at the low speed (i.e., mode 1). At 606, control determines whether the second control signal Y2 is asserted. At 608, in response to the second control signal Y2 not being asserted, control determines whether the compressor runtime in the low-capacity mode is exceeded, as described above. Control returns to 604 if the compressor runtime in the low-capacity mode is not exceeded. At 610, if the compressor runtime in the low-capacity mode is exceeded, control determines whether the second control signal Y2 is asserted. At 612, in response to the second control signal Y2 not being asserted, control operates the compressor 12 in the high-capacity mode and the indoor fan 19 at the low speed (i.e., mode 2).

At 614, control determines whether the first control signal Y1 is de-asserted. Control returns to 610 if the first control signal Y1 is not de-asserted. At 616, if the first control signal Y1 is de-asserted, control turns off the compressor 12 and the indoor fan 19, and control returns to 602.

At 618, if the two-stage thermostat asserts the second control signal Y2 at 606 or 610, control operates the compressor 12 in the high-capacity mode and the indoor fan 19 at the high speed (i.e., mode 4). At 620, control determines whether the second control signal Y2 is de-asserted. Control returns to 612 if the second control signal Y2 is de-asserted. Control returns to 618 if the second control signal Y2 is not de-asserted.

At 622, when the compressor and the indoor fan are initially turned off, if at 602 the two-stage thermostat 26-1 asserts the second control signal Y2 instead of and/or in addition to the first control signal Y1, control turns on the compressor 12 and the indoor fan 19 and operates the compressor 12 in the high-capacity mode and the indoor fan 19 at the high speed (i.e., mode 4). At 624 control determines whether the second control signal Y2 is de-asserted and the first control signal Y1 is asserted. Control returns to 622 if the second control signal Y2 is not de-asserted and the first control signal Y1 is not asserted. At 626, if the second control signal Y2 is de-asserted and the first control signal Y1 is asserted, control operates the compressor 12 in the high-capacity mode and the indoor fan 19 at the low speed (i.e., mode 2). At 628, control determines whether the first control signal Y1 is de-asserted. Control returns to 626 if the first control signal Y1 is not de-asserted. At 630, if the first control signal Y1 is de-asserted, control turns off the compressor 12 and the indoor fan 19, and control returns to 602.

Figure 13B:
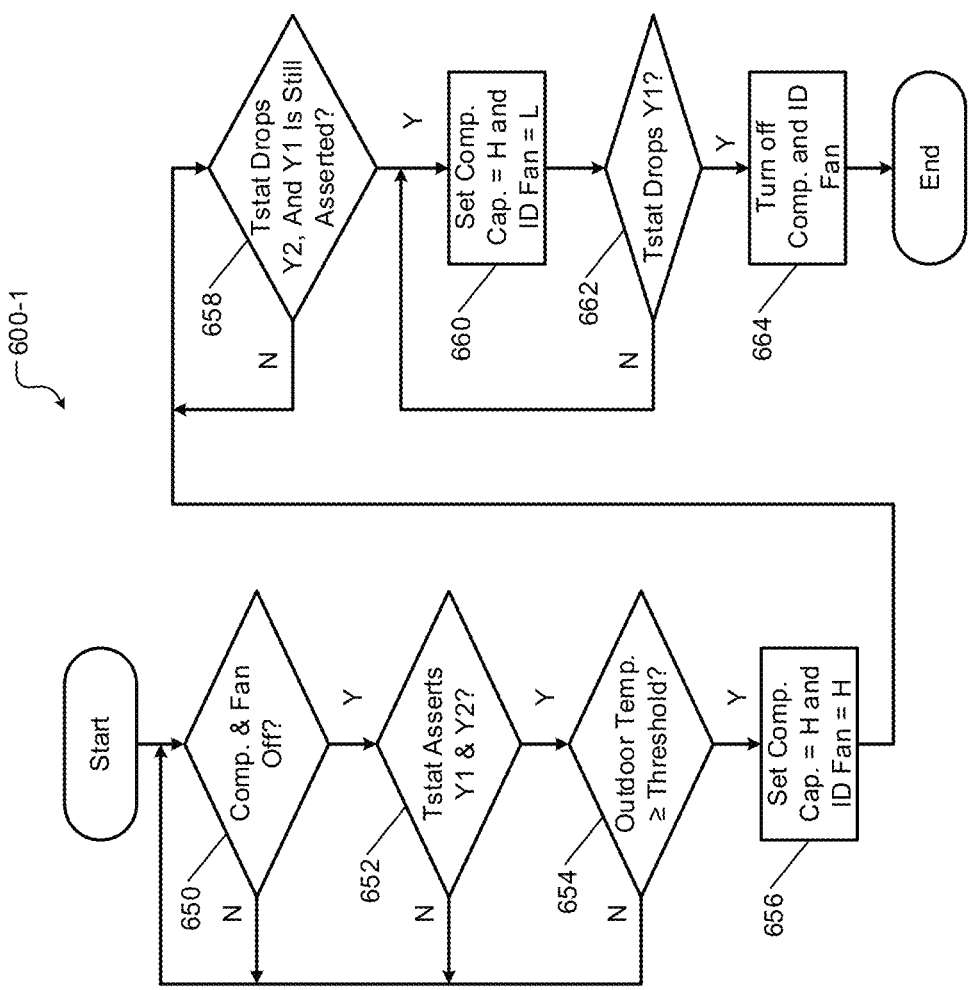
FIG. 13B is a flowchart of an additional method for operating the two-stage climate control system of FIG. 11C.

FIG. 13B shows another method 600-1 for operating a two-stage system (e.g., the two-stage systems 500 and 500-1) including a variable capacity compressor such as the compressor 12, a variable speed indoor fan such as the indoor fan 19, and a two-stage thermostat such as the two-stage thermostat 26-1. At 650, control determines whether the compressor and the indoor fan are initially turned off. At 652, control additionally determines whether the two-stage thermostat asserts the first control signal Y1 and also the second control signal Y2. At 654, control additionally determines whether the outdoor temperature is greater than or equal to a predetermined threshold.

At 656, if all of the above three conditions are satisfied, control directly operates the compressor 12 in the high-capacity mode and the indoor fan 19 at the high speed (i.e., mode 4). At 658, control determines whether the second control signal Y2 is de-asserted and whether the first control signal Y1 still remains asserted. Control continues to operate the compressor 12 in the high-capacity mode and the indoor fan 19 at the high speed (i.e., mode 4) if both the first and second control signals Y1 and Y2 continue to remain asserted (i.e., if the second control signal Y2 is not de-asserted and if the first control signal Y1 still remains asserted).

At 660, if the second control signal Y2 is de-asserted and if the first control signal Y1 still remains asserted, control continues to operate the compressor 12 in the high-capacity mode and operates the indoor fan 19 at the low speed (i.e., mode 2). At 662, control determines whether the first control signal Y1 is also de-asserted. Control returns to 660 if the first control signal Y1 is not de-asserted (i.e., still remains asserted). At 664, if the first control signal Y1 is also de-asserted, control turns off the compressor 12 and the indoor fan 19.

Accordingly, as described in various embodiments above, a system according to the present disclosure includes a compressor, an indoor fan, a thermostat, an indoor fan controller, and a compressor controller. The thermostat provides first and second signals based on indoor loading. The fan controller operates the fan in low speed mode and the compressor controller operates the compressor in low capacity mode when only the first signal is asserted. The compressor controller automatically switches the compressor to high capacity mode if only the first signal remains asserted past the low capacity mode runtime. The fan controller operates the fan in high speed mode when the second signal is asserted while the first signal is still asserted. The compressor controller continues to operate the compressor in high capacity mode and the fan controller operates the fan in low speed mode after the second signal is de-asserted, until the first signal is de-asserted, at which point the fan and compressor are turned off. The controllers operate the compressor and fan directly from a stopped condition in high capacity mode and high speed when the first and second signals are asserted and the outdoor temperature exceeds a threshold value, and then in high capacity mode and low speed when the second signal is de-asserted while the first signal is still asserted, until the first signal is de-asserted.

The two-stage systems 500 and 500-1 provide many benefits. For example, in the absence of the second control signal Y2, the capacity of the compressor 12 is switched based on OAT. This allows for proactive compressor capacity switching in response to temperature changes since the indoor load is relatively static in nature and follows OAT and is therefore predictable. The two-stage system 500 retains the diurnal/slope based capacity selection of the compressor as described with reference to FIGS. 1-10 for load matching. The two-stage systems 500 and 500-1 also retain the latent cooling benefits through mode 2 operation, where the compressor is operated in the high-capacity mode and the indoor fan is operated at the low speed, which helps in reducing humidity.

Further, the two-stage thermostat 26-1 provides the following benefits. It allows users to manually override the normal operation by manually setting high demand, to which the two-stage system responds by directly operating the compressor 12 in the high-capacity mode and the indoor fan 19 at the high speed (i.e., mode 4), which provides immediate sensible cooling benefit. Subsequently, the two-stage system keeps the compressor 12 operating in the high-capacity mode and operates the indoor fan 19 at the low speed, which again offers the latent cooling benefits by reducing humidity. The two-stage system can perform similar operation if the two-stage thermostat 26-1 includes a setback feature that can be used to assert high demand manually or by programming. The two-stage system also changes the speed of the indoor fan to match the indoor sensible cooling load.

The present disclosure describes a two-stage cooling system for example only. The teachings of the present disclosure apply equally to a two-stage heating system and to a two-stage heat pump system.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate control system comprising:
a two stage thermostat providing a first signal based on detecting a first condition relating to an indoor temperature and a second signal based on detecting a second condition relating to the indoor temperature;
a compressor operable at a first capacity and a second capacity that is greater than the first capacity based on one or more of the first signal and the second signal;
an indoor fan operable at a first speed and a second speed that is greater than the first speed based on one or more of the first signal and the second signal; and a controller operating the compressor and the indoor fan:
in response to the two stage thermostat asserting the first signal, initially at the first capacity and the first speed and subsequently at the second capacity and the first speed;
thereafter in response to the two stage thermostat asserting the second signal, at the second capacity and the second speed; and
thereafter in response to the two stage thermostat de-asserting the second signal, at the second capacity and the first speed until the first signal is de-asserted.

2. The climate control system of claim 1 wherein:
the two stage thermostat detects the first condition when the indoor temperature differs from a desired temperature setting of the two stage thermostat by a first amount; and
the two stage thermostat detects the second condition when the indoor temperature differs from the desired temperature setting of the two stage thermostat by a second amount.

3. The climate control system of claim 1 wherein the controller operates the compressor and the indoor fan, in response to the two stage thermostat asserting the first signal, initially at the first capacity and the first speed for a predetermined time period and subsequently at the second capacity and the first speed based on an outdoor air temperature.

4. The climate control system of claim 1 wherein the two stage thermostat asserts the second signal in response to the indoor temperature differing from a desired temperature by greater than or equal to a predetermined amount after the compressor and the indoor fan have been operated respectively at the second capacity and the first speed for a predetermined time period.

5. The climate control system of claim 1 wherein the two stage thermostat asserts the second signal after the compressor and the indoor fan have been operated respectively at the second capacity and the first speed for a predetermined time period.

6. The climate control system of claim 1 wherein the two stage thermostat asserts the second signal for a predetermined time period and de-asserts the second signal after the predetermined time period.

7. The climate control system of claim 1 wherein the two stage thermostat asserts the second signal until the indoor temperature differs from a desired temperature by less than or equal to a predetermined amount and de-asserts the second signal after the indoor temperature differs from the desired temperature by less than or equal to the predetermined amount.

8. The climate control system of claim 1 wherein the controller turns off the compressor and the indoor fan after the first signal is de-asserted.

9. A system comprising:
a compressor operable at a first capacity and a second capacity that is greater than the first capacity;
an indoor fan operable at a first speed and a second speed that is greater than the first speed;
a thermostat providing a first signal for changing an indoor temperature by a first amount and a second signal for changing the indoor temperature by a second amount; and
a controller operating the compressor and the indoor fan:
in response to the thermostat asserting the first signal, initially at the first capacity and the first speed and subsequently at the second capacity and the first speed;
then in response to the thermostat asserting the second signal, at the second capacity and the second speed until the second signal is de-asserted; and
then at the second capacity and the first speed until the first signal is de-asserted.

10. The system of claim 9 wherein the controller operates the compressor and the indoor fan, in response to the thermostat asserting the first signal, initially at the first capacity and the first speed for a predetermined time period and subsequently at the second capacity and the first speed based on an outdoor air temperature.

11. The system of claim 9 wherein the thermostat asserts the second signal in response to the indoor temperature differing from a desired temperature by greater than or equal to a predetermined amount after the compressor and the indoor fan have been operated respectively at the second capacity and the first speed for a predetermined time period.

12. The system of claim 9 wherein the thermostat asserts the second signal after the compressor and the indoor fan have been operated respectively at the second capacity and the first speed for a predetermined time period.

13. The system of claim 9 wherein the thermostat asserts the second signal for a predetermined time period and de-asserts the second signal after the predetermined time period.

14. The system of claim 9 wherein the thermostat asserts the second signal until the indoor temperature differs from a desired temperature by less than or equal to a predetermined amount and de-asserts the second signal after the indoor temperature differs from the desired temperature by less than or equal to the predetermined amount.

15. The system of claim 9 wherein the controller turns off the compressor and the indoor fan after the first signal is de-asserted.

16. A system comprising:
a compressor operable at a first capacity and a second capacity that is greater than the first capacity;
an indoor fan operable at a first speed and a second speed that is greater than the first speed;
a thermostat providing a first signal for changing an indoor temperature by a first amount and a second signal for changing the indoor temperature by a second amount; and
a controller operating the compressor and the indoor fan:
at the second capacity and the second speed in response to the thermostat asserting the first signal and the second signal, and in response to an outdoor air temperature or other measured indicator of outdoor thermal load being greater than or equal to a predetermined threshold; and
subsequently at the second capacity and the first speed in response to the thermostat de-asserting the second signal while the first signal remains asserted.

17. The system of claim 16 wherein the controller operates the compressor and the indoor fan at the second capacity and the first speed until the first signal is de-asserted and turns off the compressor and the indoor fan after the first signal is de-asserted.

18. A method for a compressor operable at a first capacity and a second capacity that is greater than the first capacity and an indoor fan operable at a first speed and a second speed that is greater than the first speed, the method comprising:
providing a first signal for changing an indoor temperature by a first amount and a second signal for changing the indoor temperature by a second amount;

operating the compressor and the indoor fan at the second capacity and the second speed in response to the first signal and the second signal being asserted, and in response to an outdoor air temperature or other measured indicator of outdoor thermal load being greater than or equal to a predetermined threshold; and subsequently operating the compressor and the indoor fan at the second capacity and the first speed in response to the second signal being de-asserted while the first signal remains asserted.

19. The method of claim 18 further comprising:

operating the compressor and the indoor fan at the second capacity and the first speed until the first signal is de-asserted; and turning off the compressor and the indoor fan after the first signal is de-asserted.

\* \* \* \* \*